United States Patent [19]
Davis et al.

[11] Patent Number: 5,287,541
[45] Date of Patent: Feb. 15, 1994

[54] GLOBAL SATELLITE COMMUNICATION SYSTEM WITH GEOGRAPHIC PROTOCOL CONVERSION

[75] Inventors: Walter L. Davis, Coral Springs; Philip P. Macnak, West Palm Beach, both of Fla.

[73] Assignee: Motorola, Inc., Schaumburg, Ill.

[21] Appl. No.: 685,808

[22] Filed: Apr. 15, 1991

Related U.S. Application Data

[63] Continuation-in-part of Ser. No. 431,105, Nov. 3, 1989, Pat. No. 5,008,952.

[51] Int. Cl.[5] .......................................... H04B 7/185
[52] U.S. Cl. .................................. 455/12.1; 455/13.1; 455/33.1
[58] Field of Search ................... 455/12.1, 13.1, 13.2, 455/13.3, 33.1, 33.3, 56.1; 379/59

[56] References Cited

U.S. PATENT DOCUMENTS

| | | | |
|---|---|---|---|
| 3,906,166 | 9/1975 | Cooper et al. | 179/41 A |
| 4,178,476 | 12/1979 | Frost. | |
| 4,425,637 | 1/1984 | Acampora et al. | 455/13.3 |
| 4,456,988 | 6/1984 | Nakagome et al. | 455/13.3 |
| 4,644,347 | 2/1987 | Lucas et al. | 340/825.04 |
| 4,654,867 | 3/1987 | Labedz et al. | 379/59 |
| 4,775,974 | 10/1988 | Kobayashi | 370/94.1 |
| 4,926,422 | 5/1990 | Alaria et al. | 370/97 |
| 5,008,952 | 4/1991 | Davis et al. | 455/12.1 |

Primary Examiner—Reinhard J. Eisenzopf
Assistant Examiner—Edward Urban
Attorney, Agent, or Firm—Philip P. Macnak; Thomas G. Berry; Daniel R. Collopy

[57] ABSTRACT

A satellite communication system (1110) provides geographic protocol conversion for message delivery between communication transceivers (1118, 1118') operating within at least two geographic areas (1116, 1116'). The satellite based communication system (1110) comprises a first communication transceiver (1118) which provides two-way message delivery within a first radiotelephone network (1114) located within at least a first geographic area (1116), the two-way message being encoded in a first predetermined message transmission protocol. The first communication transceiver (1118) further enables two-way message delivery with a communication satellite (1120), the message also being encoded in the first predetermined message transmission protocol. The communication satellite (1120) comprises a satellite transceiver (1312, 1328, 1310), for enabling the two-way delivery of the message encoded in the first predetermined message transmission protocol with the first communication transceiver (1118), and a protocol converter (1314) for converting the message encoded in the first predetermined message transmission protocol into a message encoded in a second predetermined message transmission protocol. The satellite transceiver (1312, 1328, 1310) further enables two-way delivery of the message encoded in the second predetermined message transmission protocol with at least a second communication transceiver (1118') operating within a second geographic area (1116').

16 Claims, 16 Drawing Sheets

GLOBAL SATELLITE COMMUNICATION SYSTEM WITH GEOGRAPHIC PROTOCOL CONVERSION

RELATED APPLICATIONS

This application is a continuation-in-part of U.S. patent application Ser. No. 07/431,105, filed Nov. 3, 1989 by Davis, et al., now U.S. Pat. No. 5,008,952 entitled "Global Satellite Communication System with Geographic Protocol Conversion".

BACKGROUND OF THE INVENTION

1. Field of the Invention

The present invention relates to global satellite communication systems and more particularly to a global satellite communication system providing transmission protocol conversion for cellular radiotelephone systems based on the geographic coverage areas provided.

2. Description of the Prior Art

Numerous nationwide communication systems, such as nationwide paging systems, have also been proposed and a number of such systems are currently in operation around the world. While these systems fulfill the need to deliver information on a limited nationwide basis, they fall short of providing true nationwide information delivery. This is due to the fact that such nationwide systems were limited only to those service areas where the nationwide system service provider had a communication system infrastructure in place, which was generally only in the major metropolitan areas. Such nationwide systems have provided a centralized message input, or collection, point to which all messages to be handled by the system were directed. The messages were then distributed by landline or by satellite to each of the cities in the network. The messages, as they were received in each of the network cities, were then processed as a conventional message for transmission throughout the local systems. Because the messages were transmitted throughout the nationwide system, problems with message throughput are expected as the number of subscribers belonging to the system increases.

Networking such nationwide systems to provide information delivery on a global basis reaching far beyond the immediate boundaries of the nationwide system service provider is a goal of many of these systems. However, such systems would at best, only provide limited global system coverage in the manner described for the present nationwide systems. It would also be anticipated that the problems with message throughput would become even more severe when the messages are distributed throughout the global system, and transmitted in each of the cities making up the global system.

One solution to the problem of limited nationwide paging coverage, and complete global paging coverage, is by means of a satellite based communication system, in which the satellite, or satellites, would be active in transmitting the messages directly to the ground based communication receivers. The success of such a satellite based communication system would depend directly on how many users can be covered by the system to help defray the very high costs associated with satellite systems, both paging users and cellular radiotelephone users. In addition, the acceptance of a global communication system would depend on the utility the system offers the end-users.

Acceptance of a satellite based communication system is complicated by the fact that there are several "standard" paging protocols, and several "standard" cellular transmission protocols in use around the world. These paging protocols include such digital signaling formats as the Golay Sequential Code (GSC) and POCSAG signaling formats, and such analog tone signaling formats as the Motorola 5/6-tone signaling format and the ZVEI and CCIR 6-tone signaling formats. Many other signaling formats are in use, as well, around the world. New signaling standards, such as the ERMES European paging standard will also be in place in the future. To facilitate a global satellite communication system, the system would have to provide service in a number of signaling formats in order to gain the broad acceptance required to make such a system cost effective.

Numerous cellular communication systems are in use today which operate using well known cellular signalling protocols. New cellular signalling protocols are being proposed to improve cellular communications and the number of subscribers which may be handled within the systems. The conventional and new cellular communication protocols are not compatible. As a result, communication between cellular transceivers operating in one cellular communication system cannot directly communicate to cellular radiotelephones operating in non-compatible cellular communication systems without first converting to an analog voice message which is handled through the public switched telephone network. When cellular radiotelephones become available to communicate directly through satellites, cellular radiotelephones will be unable to communicate directly, again due to the cellular communication protocol differences which can be present. There is a need to provide geographic protocol conversion of cellular communication protocols to enable communication between non-compatible cellular communication systems. To facilitate a global satellite cellular transmission system, the system would have to provide service in a number of cellular transmission protocols also in order to gain the broad acceptance required to make such a system cost effective.

In addition to the problems associated with processing multiple signaling formats and cellular transmission protocols, the assignments of operating frequencies for pagers and cellular radiotelephones operating in the global system is subject to national and regional conventions regulated by the International Telecommunications Union (ITU) and national regulatory agencies, such as the Federal Communications Commission (FCC), as the communication satellite sweeps over the earth. This would require the satellite communication system to adhere to the local laws and regulations in a particular nation or region in order that service be provided on a global basis. Such a satellite based communication system must be capable of selectively transmitting over limited geographic areas on a number of different operating frequencies.

Pagers operating within the system which allow the end-user to roam, or travel, from place-to-place throughout the world would also need to be frequency-agile, in order for the pager to maintain communication with the satellite transmissions throughout the world. However, because the satellites are capable of delivering messages in a variety of signaling formats, the requirement of the pager to process different signaling formats is eliminated.

SUMMARY OF THE INVENTION

A satellite communication system provides geographic protocol conversion for message delivery between communication transceivers operating within at least two geographic areas. The satellite based communication system comprises a first communication transceiver which provides two-way message delivery within a first radiotelephone network located within at least a first predetermined message transmission protocol. The first communication transceiver further enables two-way message delivery with a communication satellite, the message also being encoded in the first predetermined message transmission protocol. The communication satellite comprises a satellite transceiver, for enabling the two-way delivery of the message encoded in the first predetermined message transmission protocol with the first communication transceiver, and a protocol converting means for converting the message encoded in the first predetermined message transmission protocol into a message encoded in a second predetermined message transmission protocol. The satellite transceiver further enables two-way delivery of the message encoded in the second predetermined message transmission protocol with at least a second communication transceiver operating within a second geographic area.

DESCRIPTION OF THE PREFERRED EMBODIMENTS

Figure 1A:
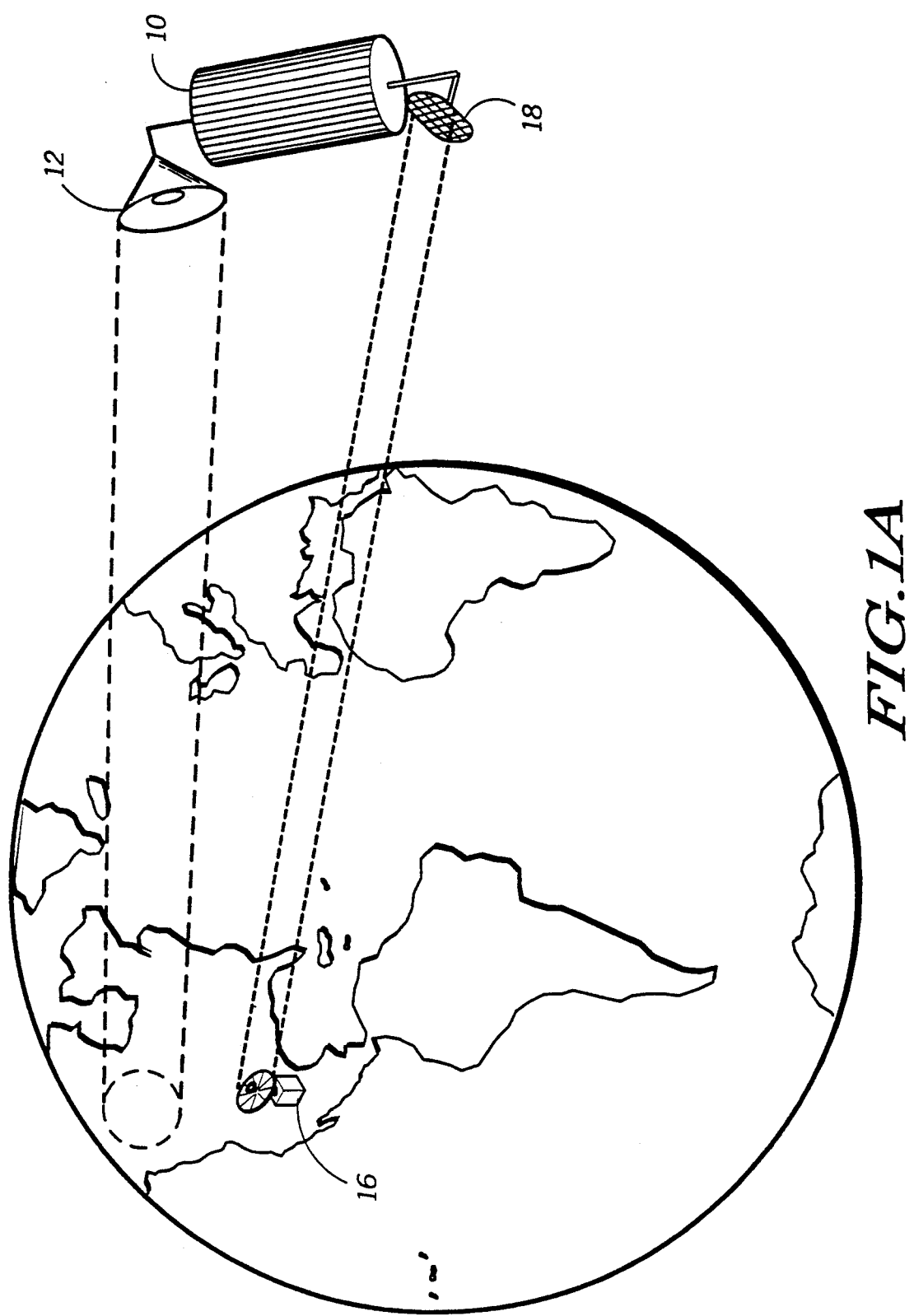
FIGS. 1A and 1B are pictorial representations of a synchronous satellite configuration for a satellite based communication system providing geographical protocol conversion in accordance with the present invention.
Figure 1B:
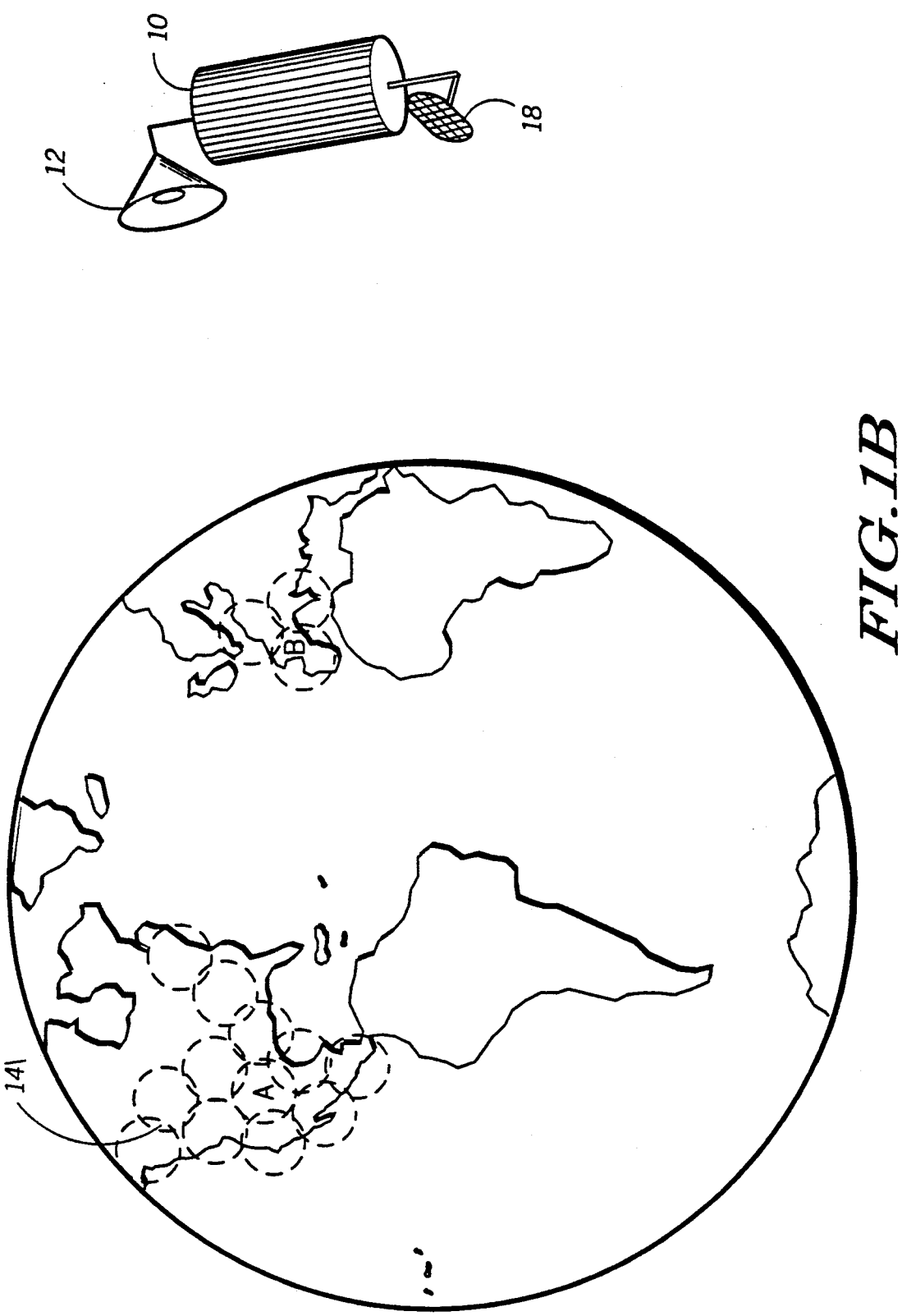

With respect to the figures, FIGS. 1 through 14 illustrate the preferred embodiment of a satellite based communication system providing geographical protocol conversion. Reference is directed to FIGS. 1A and 1B which show a first embodiment for a configuration of the global satellite communication system providing geographical protocol conversion in accordance with the present invention. As shown in FIG. 1A, one or more satellites 10 (only one of which is shown) are positioned in synchronous orbits for transmitting communication signals to the earth using an antenna 12 with a steerable antenna beam. The steerable beam antenna 12 is used to focus a transmitted radio frequency signal on a small geographical area, such as indicated by the antenna beam footprint of area 14 of FIG. 1A. Such focusing of the transmitted signal produces sufficient ground level signal strength to provide adequate performance of ground based communication receiving equipment, such as paging receivers or pagers and cellular radiotelephones, operating within the boundaries of area 14. Wide area coverage is obtained in the system by moving, or steering, the antenna beam to point at different geographical areas 14 on the earth as shown in FIG. 1B. In the system of FIG. 1A, the satellite can also change the signaling protocol and/or the down link or up link frequencies when serving customers in different geographical areas. As, for example, the down link signal would be transmitted at a frequency of 1.5 Gigahertz (GHz) using the POCSAG signaling format for pagers located in the geographical areas indicated by the letter B for the geographic areas within Europe in FIG. 1B. The down-link signal would be transmitted at a frequency of 900 Megahertz (MHz) using the Golay Sequential Code (GSC) signaling format for pagers located in the geographical areas indicated by the letter A for North and Central America. It will be appreciated, the choice of down link frequency is not arbitrary, but is controlled by the various national regulatory agencies in each country or geographic area covered by the antenna beam footprint, as such, actual transmitter and/or receiver frequencies may vary widely as operating frequencies are assigned within the satellite based communication system.

Entry of the paging messages into the satellite based communication system, when used for paging, is through the public switched telephone network (PSTN) which directs the messages to a ground station 16, or gateway, for transmission of information to the synchronous satellite 10 by way of uplink antenna 18, as shown in FIG. 1A. In the preferred embodiment in accordance with the present invention, three synchronous communication satellites at an altitude of approximately 35,000 KM would provide total global coverage with ground stations, such as gateway 16, suitably located around the world to communicate with a corresponding synchronous satellite. The format of the information being transmitted to and from the satellite to provide the geographical protocol conversion in accordance with the present invention will be described in detail shortly.

When multiple synchronous satellites are employed in the satellite communication system in accordance with the present invention, paging message information received at any of the ground stations is transferred to the corresponding satellites. However, it will be appreciated, some of the paging message information transferred to the particular satellite may be directed to pagers which are located in geographical areas not covered by the particular satellite receiving the message information. In this instance, intersatellite communications is provided between each of the synchronous satellites in orbit which allow the transfer of message information to the appropriate satellite which will ultimately deliver the messages to the pagers in a particular geographical area. Intersatellite communications will be described in further detail later in the specification.

Figure 2:
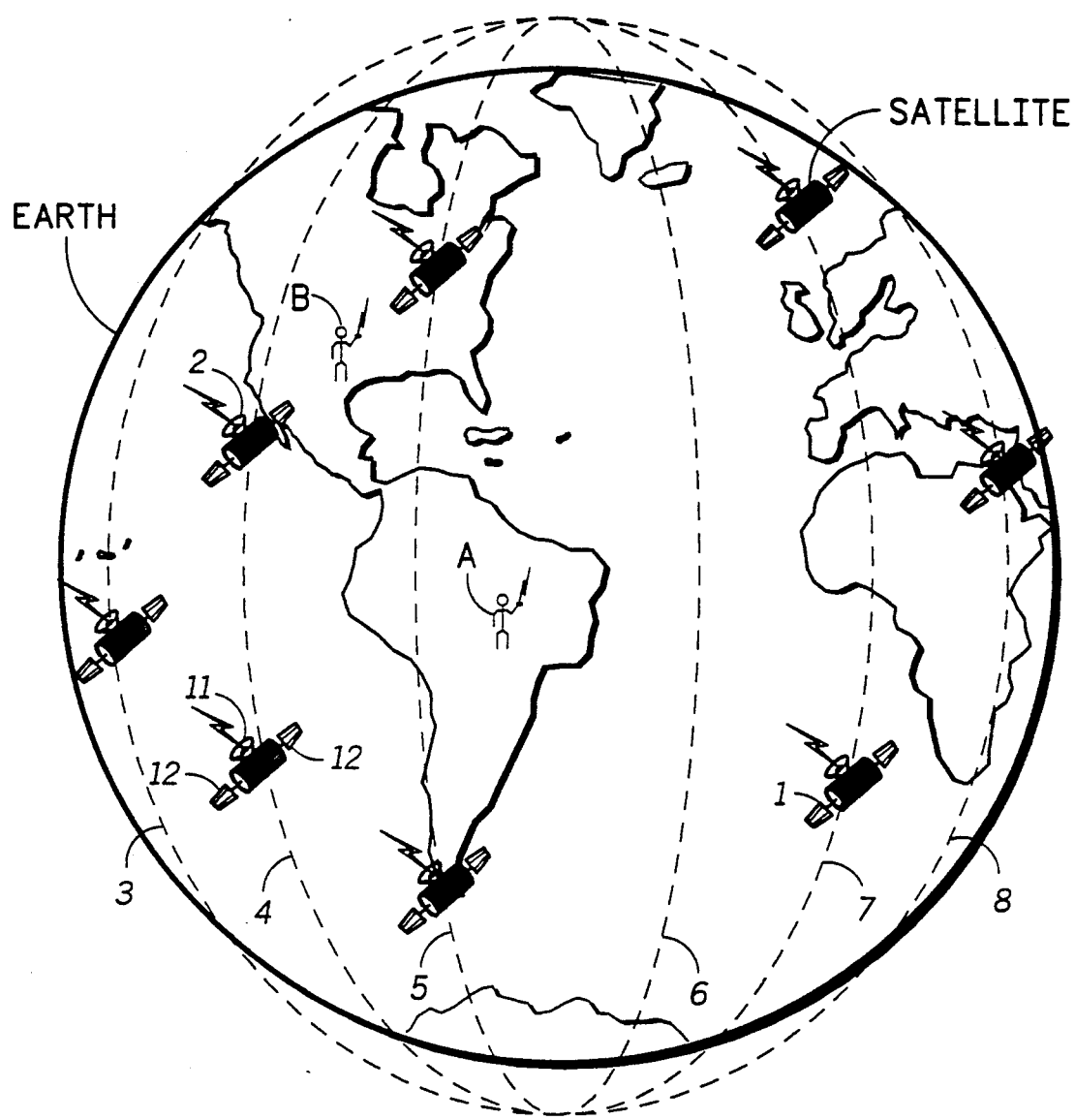
FIG. 2 is a pictorial representation of a non-synchronous satellite configuration for a satellite based communication system providing geographical protocol conversion in accordance with the present invention.

Referring to FIG. 2, a second embodiment of a satellite configuration for a global satellite based communication system in accordance with the present invention is shown. In this configuration, a plurality of satellites are shown in non-synchronous, low earth orbits. The satellites are placed in a number of orbiting planes. The orbiting planes (3 through 8), as shown, are highly inclined in nature and provide paging coverage for the entire earth. With this system, as with the synchronous satellite based communication system of FIG. 2, users located anywhere on a land mass, on the water, or in the air at an altitude less than that of the orbiting satellites may be paged by anyone having access to the public switched telephone network.

In the non-synchronous satellite based communication system in accordance with the present invention, eleven satellites are placed in each of seven orbiting planes at an altitude of 413.53 nautical miles (765.86 kilometers) to provide complete global coverage, with each satellite in this orbit completely circling the globe approximately once every 100 minutes. It will be appreciated by one of ordinary skill in the art that the number of satellites required in the system of FIG. 2, the altitude and the orbit time are a function of how highly inclined are the orbiting planes. Lower inclined orbiting plane configurations would require more satellites than more highly inclined orbiting plane configurations. It will also be appreciated the number of satellites described in the preferred embodiment of the satellite based communication system is by way of example only, and other satellite configurations including a greater number, or a fewer number, could be utilized depending upon the particular system requirements.

Each satellite in either the synchronous or non-synchronous satellite based communication system contains a satellite control systems unit, suitable antennas 11 (helical antennas for up/down links and for cross links, for example) and an unfolding array of solar cells 12 along with storage batteries (not shown) connected to the solar cells to provide power to the control systems unit, and a satellite paging controller, or a satellite cellular protocol controller with cellular protocol converter, provides the necessary geographic protocol conversion. The satellite vehicles themselves are low-earth orbiting satellites such as those commercially available for the non-synchronous satellite based communication system. The satellites in the non-synchronous, as well as in the synchronous systems, are put into orbit by a launching vehicle. When in orbit, the solar cell array is opened and the switching unit thereby activated. The satellites are then individually brought on line via standard telemetry, tracking and control (TT&C) channels to form the satellite based communication system. In operation, paging messages can be entered into the satellite based communication system from anywhere in the world through the public switched telephone network (PSTN). Cellular radiotelephone communication is achieved using direct communication between the cellular radiotelephone and the satellites, as will be described in detail below.

Figure 3:
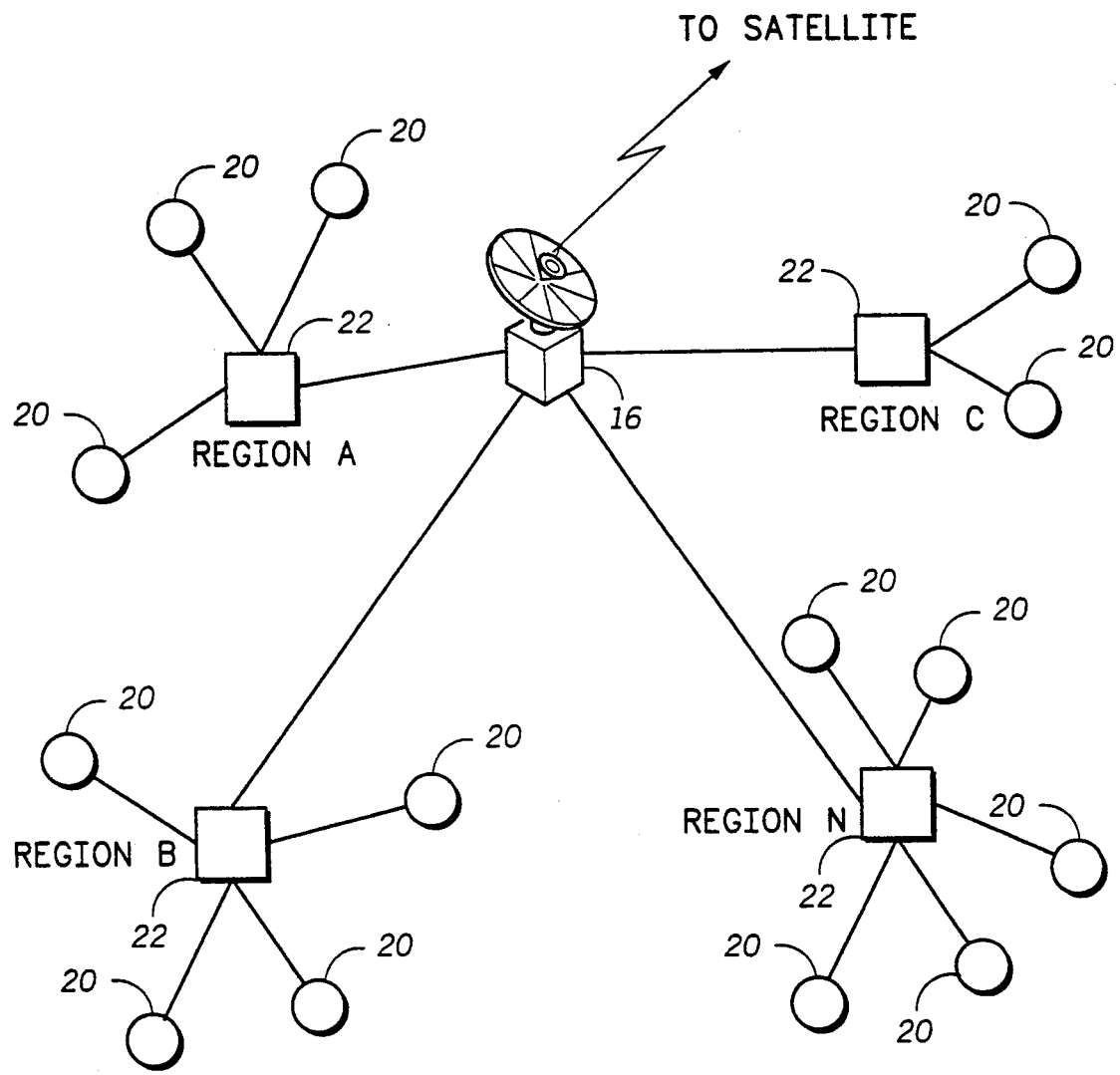
FIG. 3 is a diagram depicting a global telecommunication network used to receive and process messages for the satellite based communication system in accordance with the present invention.

FIG. 3 depicts a typical interconnection of a portion of the global satellite paging network which may be used for entry of messages into the satellite based communication system in accordance with the present invention. The global satellite network comprises local input nodes 20 and regional input and/or collection nodes 22 which act to concentrate and channel the paging messages into the satellite based communication system. The local input nodes 20 comprise terminals (not shown), such as paging terminals, which are well known in the art, to receive and process the messages received through the public switched telephone network. The local input nodes 20 are generally located at the facilities of the local paging service providers participating in the global satellite network, and as such, provide both the capability for controlling local paging services, and message handling and processing for the satellite based communication system as well. A large metropolitan area, such as indicated as Region B, can have multiple local input nodes 20, representative of a number of local paging service providers which are participating in the global satellite network. Other geographic areas, such as indicated by Region A, could represent local paging service providers located in major metropolitan areas located throughout a country, such as Canada.

The messages directed to the global satellite network are routed from the local input node 20 to the regional input, or collection node 22. Regional collection node 22 acts to further concentrate the messages from each of the local input nodes 20 for a particular geographic area, such as the large metropolitan area, a state, a country, or even a continent. The regional concentration of messages provides the most cost effective means for transmission of the messages to the trunk site 16. Because of the large volume of message traffic which must be handled to fulfill the economic requirements of a satellite based system, it is important that the transmission time required to transmit the messages received throughout the global satellite network be minimized. Message throughput is improved in the system in accordance with the present invention by not encoding the messages received at the local inputs nodes into the final signaling format prior to transmission to the trunk site. The messages are transmitted from the local input node 20 to the regional collection node 22, or from the local input node 20 to the trunk site 16 as raw data, such as BCD (binary coded decimal) or ASCII data. It will be appreciated by one skilled in the art, substantial transmission time is saved by only transmitting the raw data using conventional data transmission techniques which are well known in the art, as compared to transmitting the data encoded into the final encoded signaling format, which multiplies the data handling requirements by as much as a factor of two or more.

Interconnection of the global satellite network between the local input nodes 20 and the regional input nodes 22, and the regional input nodes 22 to the trunk site 24 may be provided by any of a number of well known methods, such as landlines, and microwave or satellite communications, depending on the distances involved and the volume of message traffic being handled from any given input node. It will be appreciated that the structure of the global satellite network described is by way of example only and is representative only of a system for concentrating and processing the volume of information which is anticipated in a satellite based communication system.

Figure 4:
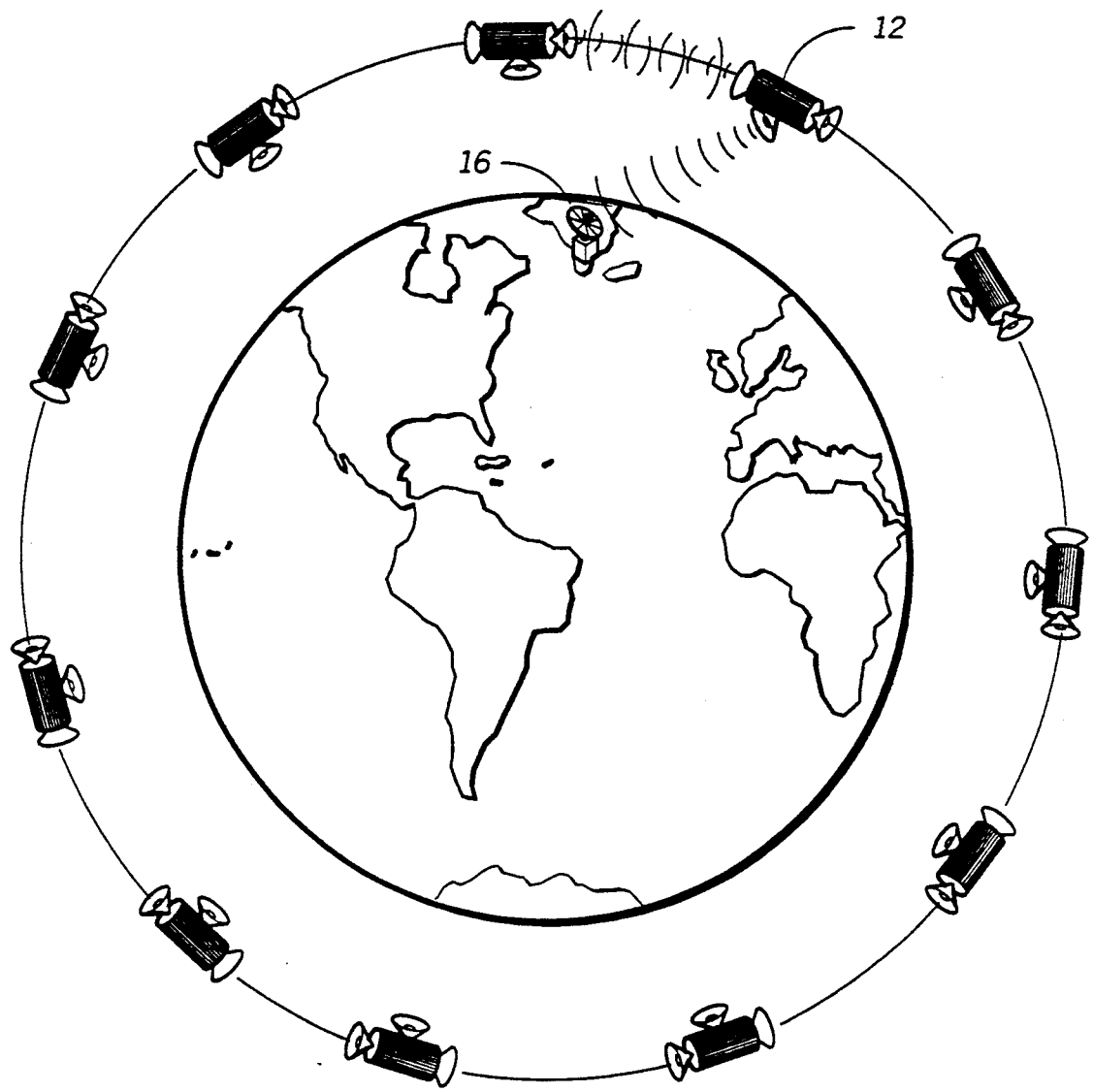
FIG. 4 is a diagram illustrating the ground station to satellite communication for the non-synchronous satellite based communication system in accordance with the present invention.

FIG. 4 shows a diagram of the relative positioning for a number of non-synchronous satellites orbiting in any one of the plurality of orbiting planes, as described for FIG. 2. An up-link transmitter, or gateway, 16 is provided to transmit the message data received from throughout the system to each of the orbiting satellites 12 as they pass substantially over the gateway 16. Since all satellites in the global satellite based communication system are in orbits which pass over the poles, as previously described in FIG. 2, only a single gateway 16 is required to access each of the satellites for control and for message delivery from the gateway 16, as shown. It will be appreciated, the position of the gateway shown is by way of example only, and other geographic locations throughout northern North America would be suitable for locating the gateway 16.

Figure 5:
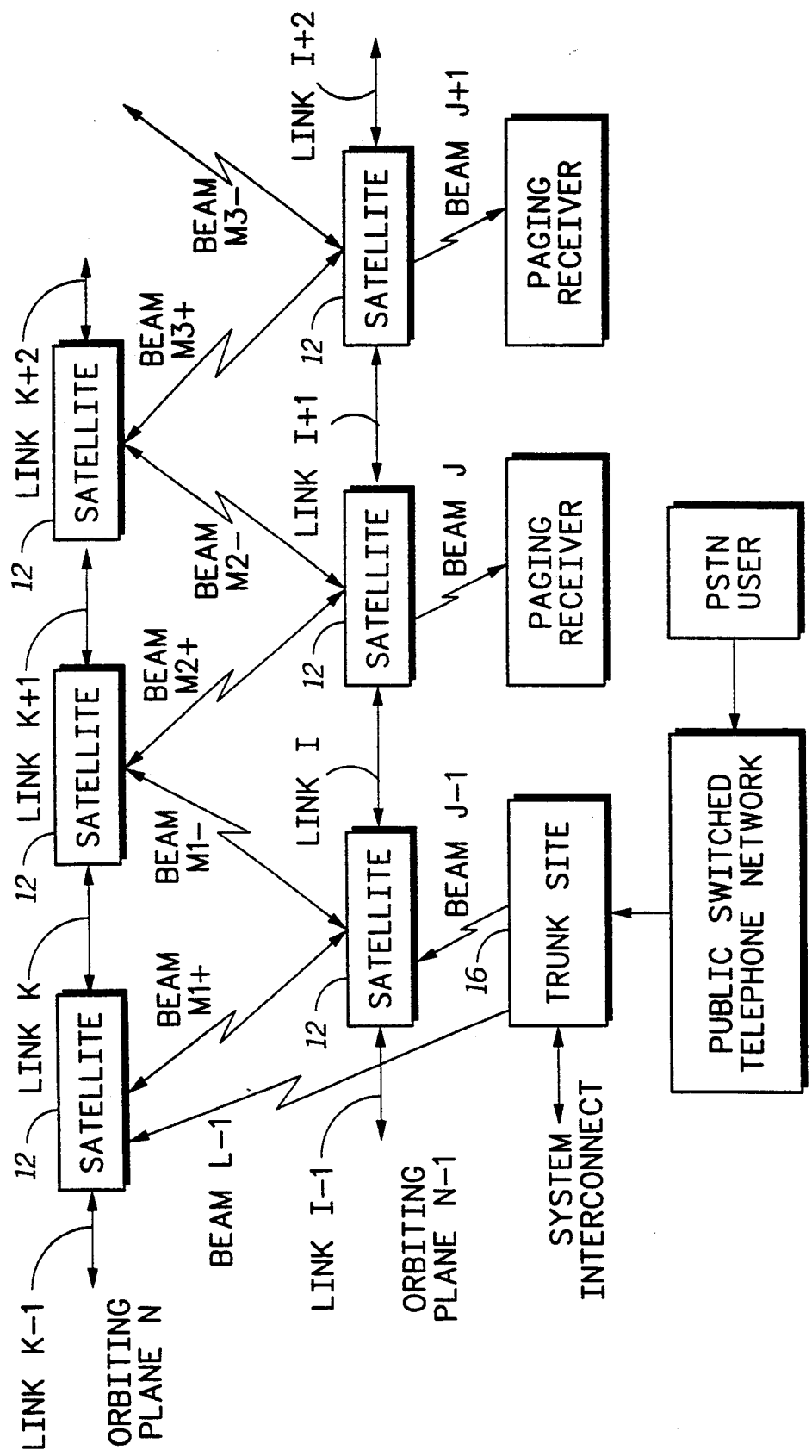
FIG. 5 is a diagram illustrating the intersatellite communication for the non-synchronous satellite based communication system in accordance with the present invention.

As shown in FIG. 5, messages received via the public switched telephone network from a PSTN user are routed to the trunk site 16, in a manner similar to that described for FIG. 3. The message information is independently beamed up to each satellite 12 in an orbiting plane as each satellite 12 appears substantially overhead via beams J−1, L−1, etc. Each satellite 12 in a particular orbiting plane is also linked via intersatellite communication to the next satellite and previous satellite, as indicated by example by link I−1, link I, link I+1, and so on, for satellites orbiting in plane N−1. This intersatellite communication system provides a means for distributing messages received by any particular satellite 12 in one orbiting plane to each and any of the other satellites 12 located in the same orbiting plane, or any other orbiting plane. In the latter case, intersatellite communication is provided in the system between one or more satellites 12 in other orbiting planes, as indicated by beam M1+ and M1−, and so forth for satellites 12 orbiting in planes N and N−1. That is, each satellite 12 in a given orbiting plane is linked to a previous satellite (beam M#−) and the next satellite (beam M#+) in an adjacent orbiting plane, thereby providing a means for distributing the received global message information throughout the entire satellite system. The intersatellite links are implemented via data transmission on a communications channel, such as a microwave beam or via a laser beam. Existing technologies currently provide for such data transmission. It will be appreciated that while the previous description described intersatellite communication for a satellite system utilizing non-synchronous satellites, a similar system can be used with synchronous satellites.

As previously described in FIG. 2, each satellite in the non-synchronous satellite system in accordance with the present invention completely circles the globe every 100 minutes. Since each orbiting plane is occupied by eleven satellites in the preferred embodiment in accordance with the present invention, a new satellite appears substantially over any geographic area approximately once every nine minutes from any one orbiting plane. Since there are seven satellite orbits provided in the non-synchronous satellite system in accordance with the present invention, a new satellite from one of the seven satellite orbits appears substantially over the gateway 16, once every one minute and eighteen seconds. As a result, global message information and control information is transmitted from the gateway 16 to one of the eleven satellites in one of the seven orbiting planes which regularly appears over the gateway 16. Thereafter, the global message information is processed on-board the receiving satellite, as will be explained in further detail later, for further distribution of the information to the other satellites located around the world, or is transmitted by the receiving satellite to those communication receivers falling in the present track of the receiving satellite.

As previously described, global message information entered into the satellite based communication system in accordance with the present invention is forwarded from the local inputs nodes 20 to the gateway 16 without being processed into a particular signaling format. In one embodiment in accordance with the present invention, the global message information is processed into the appropriate signaling format for the pager to which the information is directed, prior to the transmission from the gateway 16 to the overhead receiving satellite. In an alternate embodiment in accordance with the present invention, the global message information is transmitted from the gateway 16 to the overhead receiving satellite without processing into the final signaling format. In this instance, the final processing into the appropriate signaling format occurs within the particular satellite which is to ultimately deliver the message. The operation of both embodiments in accordance with the present invention will become more apparent in the description to follow.

Figure 6A:
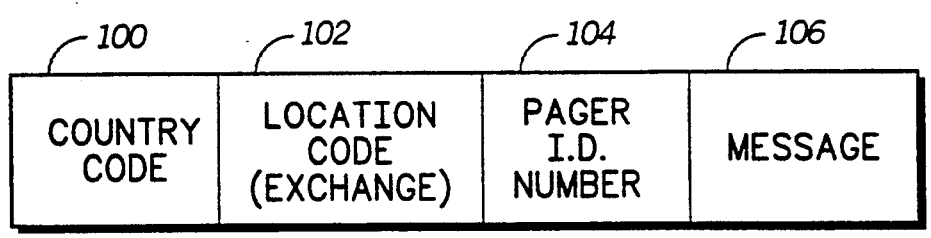
FIG. 6A and 6B are timing diagrams illustrating formats for entering messages into the satellite based communication system in accordance with the present invention.

FIG. 6A, shows one possible format for the entry of information by a message originator through the public switched telephone network. It will be noted FIG. 6A shows a format that is very similar to that used for international telephone service. That is, the format contains a country code 100, an exchange or location code 102, and a pager I.D. number 104 followed by the message 106. This format would be used when the message originator knows the particular country code 100 and location code 102 information for the pager to which the message is intended. The country code 100 and the location code 102 information is processed at the trunk station to determine satellite routing information which will be described in detail shortly. The routing information defines which satellite in the synchronous or non-synchronous satellite systems will be in position to deliver the message at the earliest time. The country code 100, location code 102, pager I.D. number 104, message portion 106 and the orbiting information are transmitted from the trunk station to the satellite currently overhead. Once received, the routing information is processed, as will be described shortly, to forward the message to the delivery satellite anywhere around the globe. The message delivery satellite uses the country code 100 and location code 102 information to determine the appropriate down link frequency and signaling protocol for message delivery. In one embodiment in accordance with the present invention, the information transmitted from the trunk station to the satellites is not encoded, except for that required to guarantee reception at the satellite overhead. The I.D. Number 104 and the message 106, which were received in an ASCII data format, are encoded by the delivery satellite into the appropriate signalling format for the geographic delivery area, such as the POCSAG or GSC signaling formats. At the appropriate time, when the delivery satellite passes over the geographic area determined by the country code 100 and the location code 102 information, the message is beamed down to deliver the message to the intended pager.

Figure 6B:
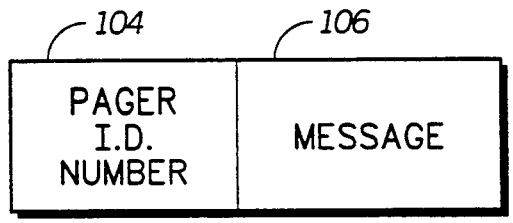

FIG. 6B shows an alternate format for message entry, wherein the country code 100 and location code 102 information is automatically provided by the system based on the current location of the pager to which the message is being directed. In this embodiment, the current location of each pager in the system is tracked in the terminal associated with the local paging system to which the pager is assigned. When the user is in the home, or local system area, messages entered through the local input node are directed for transmission on the local non-satellite system. However, when the user plans to leave the local area, such as for a business trip from Chicago to Singapore, the user would call in to the paging service provider to indicate the destination, and departure and arrival times. The system thereafter automatically adds the country code 100 and the location code 102, to the pager I.D. number 104 and the message 106 entered by the message originator. The system thereafter automatically routes the message through the satellite system, as previously described, to the proper geographic area, adding the appropriate country code 100 and location code 102, when the user is away from the local system, and omits the country code 100 and the location code 102 when the user is within the area of the local system. In this the second embodiment for message input, the required coding changes are transparent to the call originator, while the message may be delivered anywhere in the world.

Figure 7:
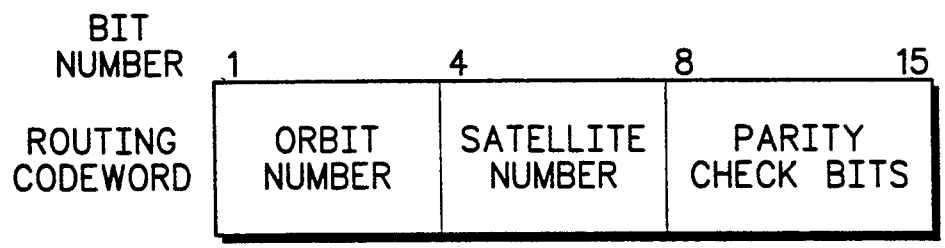
FIG. 7 is a timing diagram illustrating the format for satellite routing in the satellite based communication system in accordance with the present invention.

As previously described, satellite routing information is added at the trunk station prior to the up-link transmission to the satellites overhead. The format of the satellite routing codeword are shown in FIG. 7. It will be appreciated the format of the codeword shown is for example only, as other codeword formats may be provided depending upon the number of satellites and orbits provided within the satellite system. As the messages are received at the trunk station, the country code and location code are evaluated to determine which satellite will be in a position to deliver the message at the earliest possible time. The routing code provides an orbit number 108 and satellite number 110 of the satellite that will be scheduled to deliver the message. The delivery satellite selection is based upon a number of factors, such as whether the system is synchronous or non-synchronous, and the time to transmit the messages to the satellites and to route the messages through the satellite system. The messages are transmitted from the trunk station to the receiving satellite currently overhead in data packets containing a predetermined number of messages. After the data packet has been received by the receiving satellite, the routing code for each of the predetermined number of messages is processed to determine the routing through the intersatellite communication system for each message. Depending on the grouping of messages for the various geographic areas, it will be appreciated there can be numerous routes initiated by the receiving satellite.

In an alternate embodiment in accordance with the present invention, the routing code, rather than being determined at the trunk station, is determined by the receiving satellite. This embodiment reduces the amount of information which must be transmitted from the trunk station to the satellites, but as it will be appreciated, increases the complexity of the processing required by each satellite.

Figure 8A:
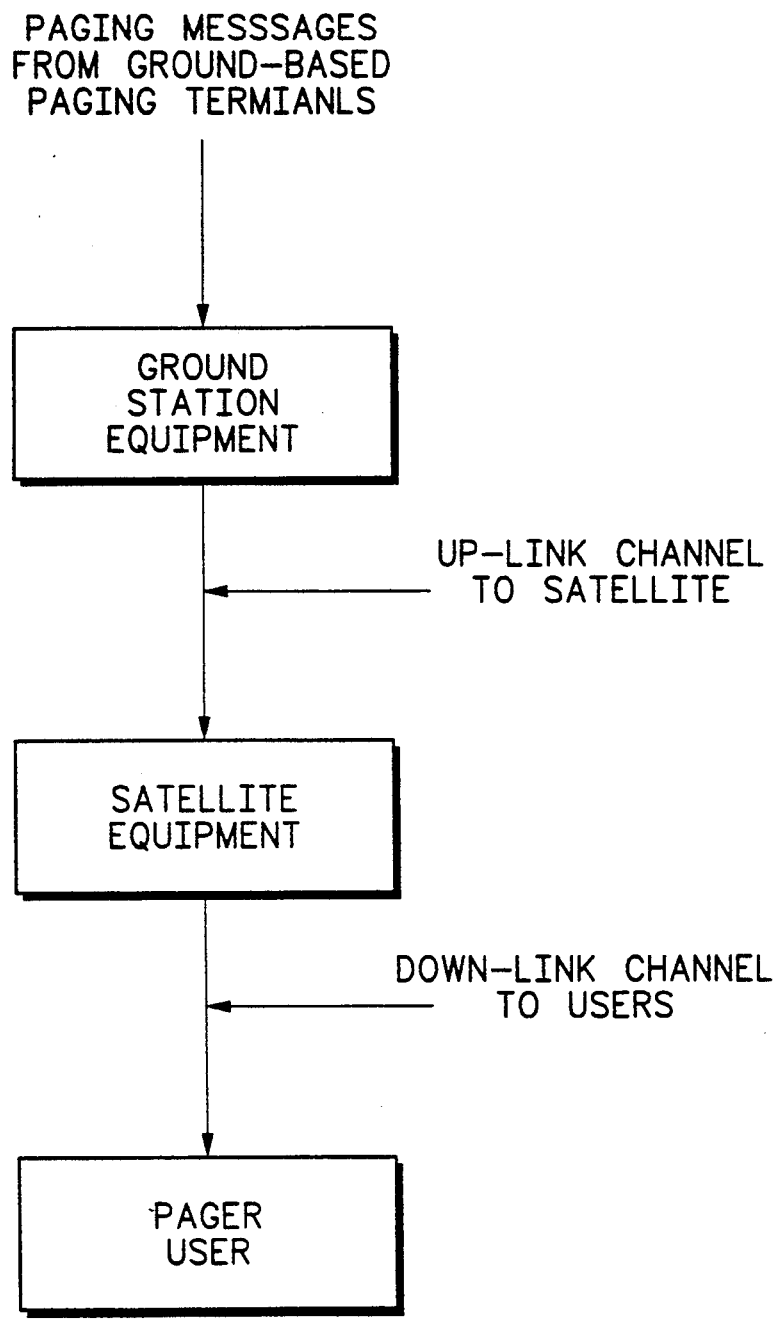
FIG. 8A shows a simplified block diagram depicting the flow of the message information through the satellite based communication system in accordance with the present invention.

FIG. 8A shows a simplified block diagram depicting the flow of the message information through the satellite based communication system. The paging messages received at the local input nodes via the public switched telephone network are received by the trunk station. The messages are processed, as previously described, by the ground station equipment described in FIG. 8B. The processed messages are transmitted to the satellites in data packets via an up-link channel as each new satellite appears substantially overhead, as in the case of a non-synchronous satellite system. The received data packets are processed by the satellite equipment described in FIG. 8C. This processing includes such steps as the selection of the transmission frequency, and encoding of the message information into the signaling protocol required for the geographic delivery area. At the appropriate time, the satellite beams down the messages using a down-link channel set to the proper frequency for the geographic area. The messages after they have been beamed down, are received by pagers operable in the satellite system, whereupon the user is alerted for having received the message.

Figure 8B:
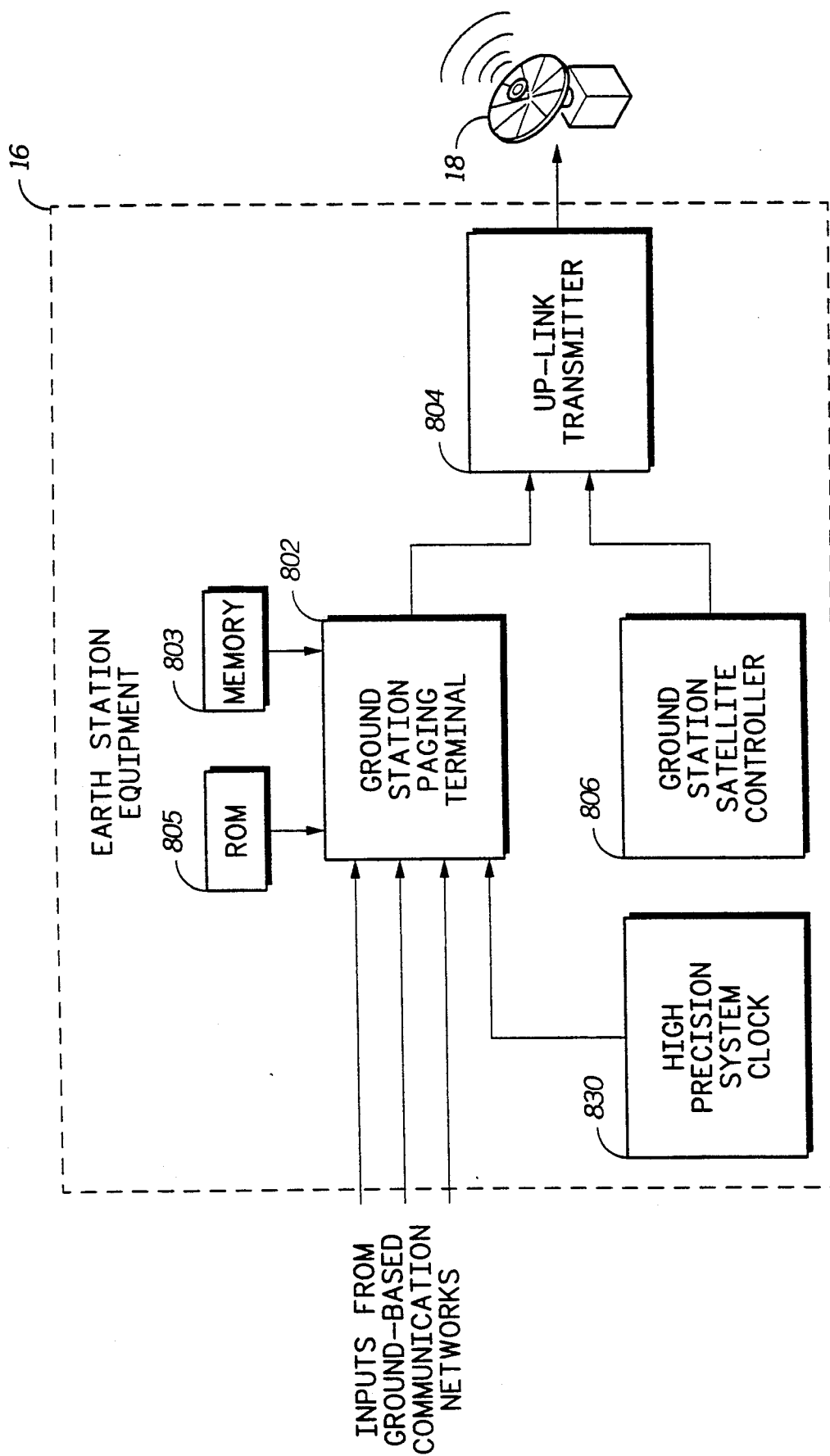
FIG. 8B is an electrical block diagram illustrating the apparatus of the trunk station for the satellite based communication system in accordance with the present invention.

FIG. 8B is a block diagram illustrating the apparatus of the trunk station 16 for the satellite based communication system of the present invention providing geographical protocol conversion. Messages transmitted through the global satellite network are received at the trunk station 16 by the ground station paging terminal 802 through one or more inputs. As previously described, the message information delivered to the inputs may be delivered via landline, or microwave or satellite communication, or any combination thereof. The ground station paging terminal 802 receives the message information in a manner well known in the art, temporarily storing the information in ground station memory 803 in an active message file, or queue. Ground station memory 803 provides non-volatile storage of the received message information, such as provided by a hard disk memory. As previously described, the country code and location code information added by the terminal at the local input node, is processed and the appropriate routing code for each message received is determined and added to the corresponding message data stored in the active message queue. The routing information is determined from satellite network information stored in read only memory (ROM) 805 and the known current position of each of the satellites around the world.

The format of the information of the active message queue is essentially the same as when originally entered into the system, in a BCD or ASCII format together with the added codewords for satellite routing, as previously described. At the appropriate time, as determined from the high precision system clock 830 which couples to the ground station paging terminal 802, the active message queue is recovered from ground station memory 803 by the ground station paging controller 802, and is transmitted by up-link transmitter 804 as a message data packet having a predetermined number of messages using directional antenna and conventional telemetry techniques to the satellite appearing substantially overhead. In addition to the transmission of the active message queue to each satellite as they appear substantially overhead, a ground station controller 806 generates control data for transmission via the up-link transmitter 804 for controlling the operation of the satellite and its on-board systems. It will be appreciated, the message data packet size is determined by the time the satellite remains substantially overhead and is in a position to receive information, and the time remaining after the satellite control information has been transmitted.

Figure 8C:
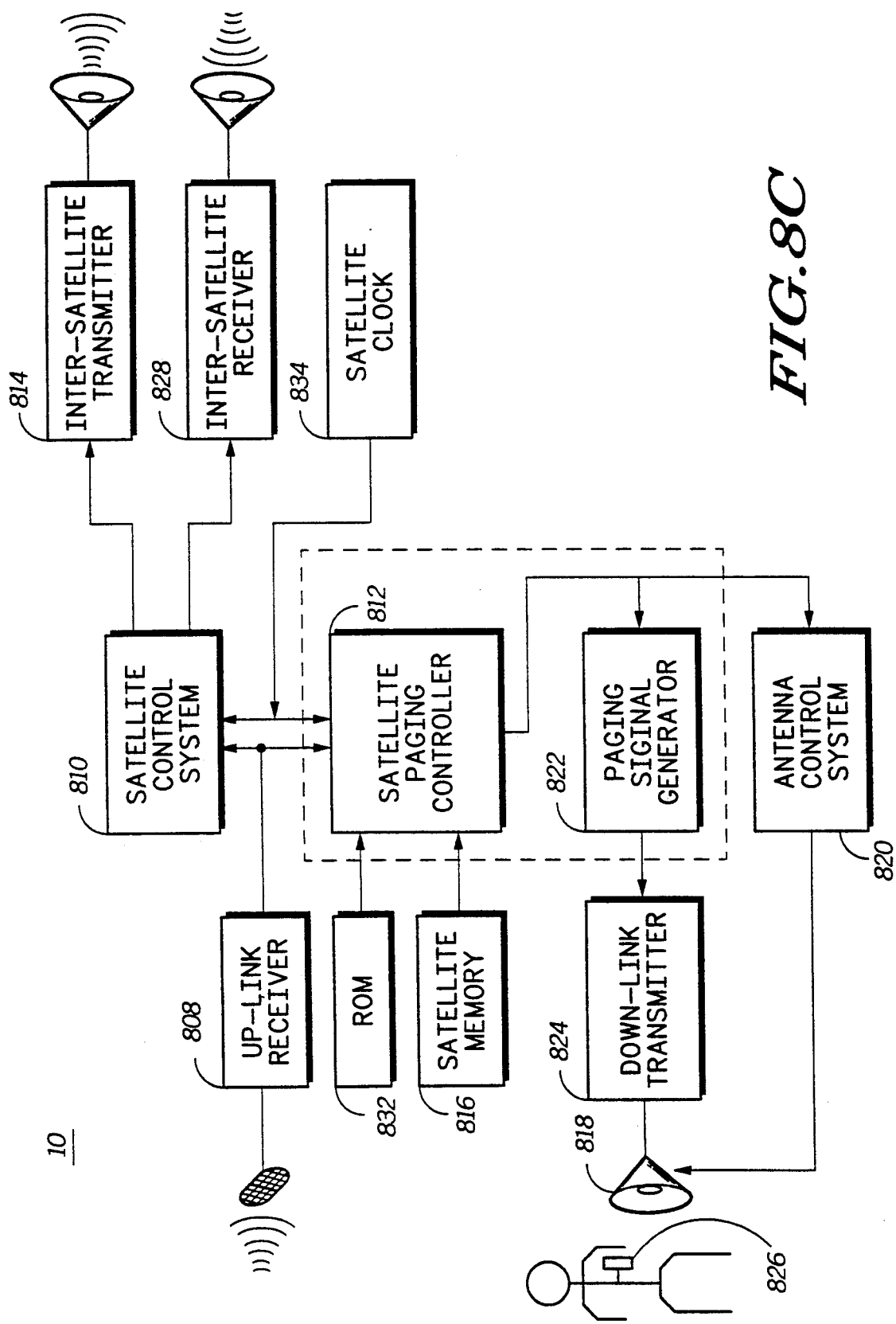
FIG. 8C is an electrical block diagram illustrating the apparatus of the satellites for the satellite based communication system in accordance with the present invention.

FIG. 8C is a block diagram illustrating the apparatus for each of the satellites of the present invention. The control information and data packets transmitted from up-link transmitter 804 are received by the satellite 10 by up-link receiver 808. The control information is processed in a manner well known to one skilled in the art by the satellite control system 810, controlling such satellite parameters as satellite orientation and altitude. The message information is processed by the satellite paging controller 812. When the routing code is included in the message data packet, the paging satellite controller 812 determines which of the nearest satellites will be used in routing the message information not intended for transmission by the receiving satellite. The intersatellite message routing is determined from satellite network information stored in the satellite read only memory (ROM) 832. The message information intended for transmission by the other satellites can be transmitted to the appropriate nearest satellite using intersatellite transmitter 814, or may be temporarily stored in satellite memory 816 until all the received message information has been processed, after which the data may be transmitted in batches to the appropriate nearest satellites.

The message information intended to be transmitted by the receiving satellite is further processed by satellite paging controller 812 for country code and location Code to determine when the transmission of the message information will occur. The message information is then temporarily stored in memory 816 until the appropriate transmission time is reached. The transmission time is determined from the satellite control system 810 which receives timing information from satellite clock 834 to determined the satellites current position around the world. The satellite control system 810 generates periodic position signals which are coupled to satellite paging controller 812, thereby allowing the satellite paging controller to determine the protocol requirements for each geographical area from protocol information stored in satellite ROM 832. As the satellite travels over each geographic area during which down-link transmissions are to be made, the satellite paging controller 812 controls the down-link antenna 818 direction via antenna control system 820. Any message information which is stored in memory 816 will be recovered at the appropriate time by satellite paging controller 812 from satellite memory 816 and supplied to paging signal generator 822. The paging signal generator 822 provides a programmable encoding means for encoding the message information which was received in the first predetermined signaling format, as previously described, and encodes the message information into a second predetermined signaling format corresponding to the signaling protocol utilized in each geographic area to which the satellite antenna is directed. Satellite paging controller 812 also controls the transmission frequency of down-link transmitter 824 thereby allowing the message information encoded in the signaling protocol for the particular geographic area to be transmitted on the down-link frequency appropriate for the particular geographic area. The transmitted message information can then be received by the paging receiver 826 anywhere within the coverage area of the antenna beam.

When message information is routed from one satellite to the next, the routed message information is received by intersatellite receiver 828. Satellite paging controller processes the received message information to determined if the received information is intended to be transmitted from the receiving satellite, or if the message information is to be routed to the next satellite in the present orbit, or in an adjacent orbit. Message information intended to be transmitted by the receiving satellite is stored as previously described and transmitted at the appropriate time as previously described. Message information not intended to be transmitted by the receiving satellite is routed to the next satellite also as previously described. While only a single intersatellite transmitter and receiver are shown in FIG. 8C, it will be appreciated multiple transmitters and receivers will be required to provide intersatellite communication between satellites in a given orbit and with satellites in different orbits.

Figure 9:
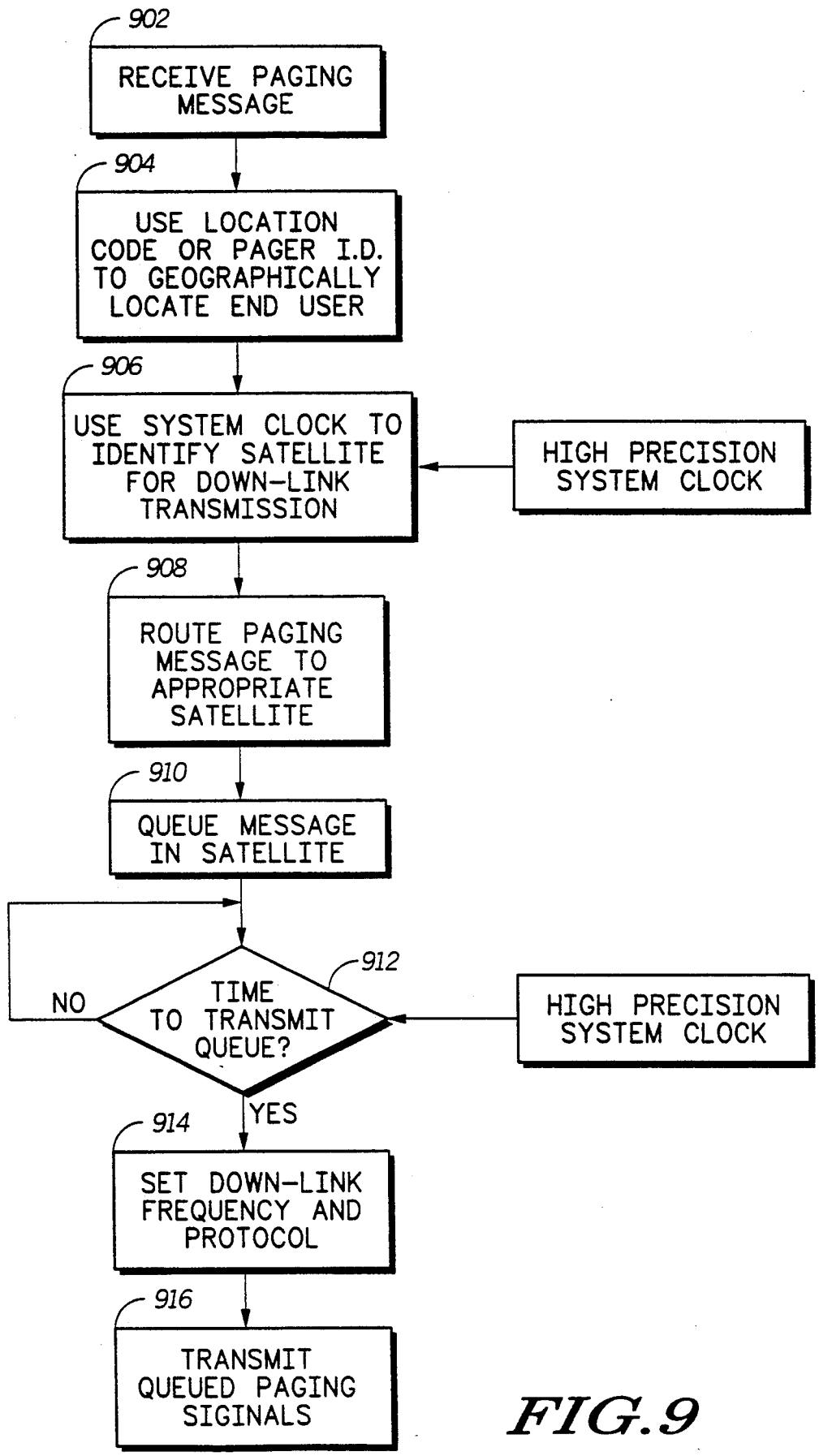
FIG. 9 is a flow chart illustrating the message flow for the satellite based communication system in accordance with the present invention.

FIG. 9 is a flow chart of the message processing for the satellite based communication system providing geographical protocol conversion of the present invention. When a message is received at any of the local input nodes, at block 902, the local terminal determines the present status of the pager for which the message is intended, i.e. whether the pager is currently assigned to receive the messages through the local paging system, or through the satellite based communication system. When the message is to be delivered through the satellite based communication system, at block 904, a country codeword and a location codeword are assigned and are added to the message, when such automatic assignment is provided, or the location codeword entered with the message is processed to determine the assigned country codeword and location codeword. The message information is then forwarded to the trunk site for transmission to the satellites.

When the trunk site receives the message information, the country codeword and location codeword are processed to identify the satellite routing information, at block 906. The satellite routing information is determined from the present location of each of the satellites in orbit, and the time required required to deliver the message information to the appropriate satellite for down-link transmission using the system clock.

The message information is next transmitted as a data packet to the next satellite appearing substantially overhead the trunk site. The receiving satellite processes the routing information, at block 908, to determine whether the message is to be delivered from the receiving satellite, or any other satellite. When the message is received at the appropriate satellite for down-link transmission, the message is queued, at block 910, for subsequent transmission. When the transmission time is reached, at block 912, which indicates the satellite is over the correct geographical area, the down-link transmitter frequency is set and the programmable encoder is set for the signaling protocol required for the particular geographical area, at block 914. The message information is encoded into the correct signaling protocol, and transmitted via the down-link transmitter, at block 916, to the pager for which the message is intended, which is now located in the current transmission area.

Figure 10:
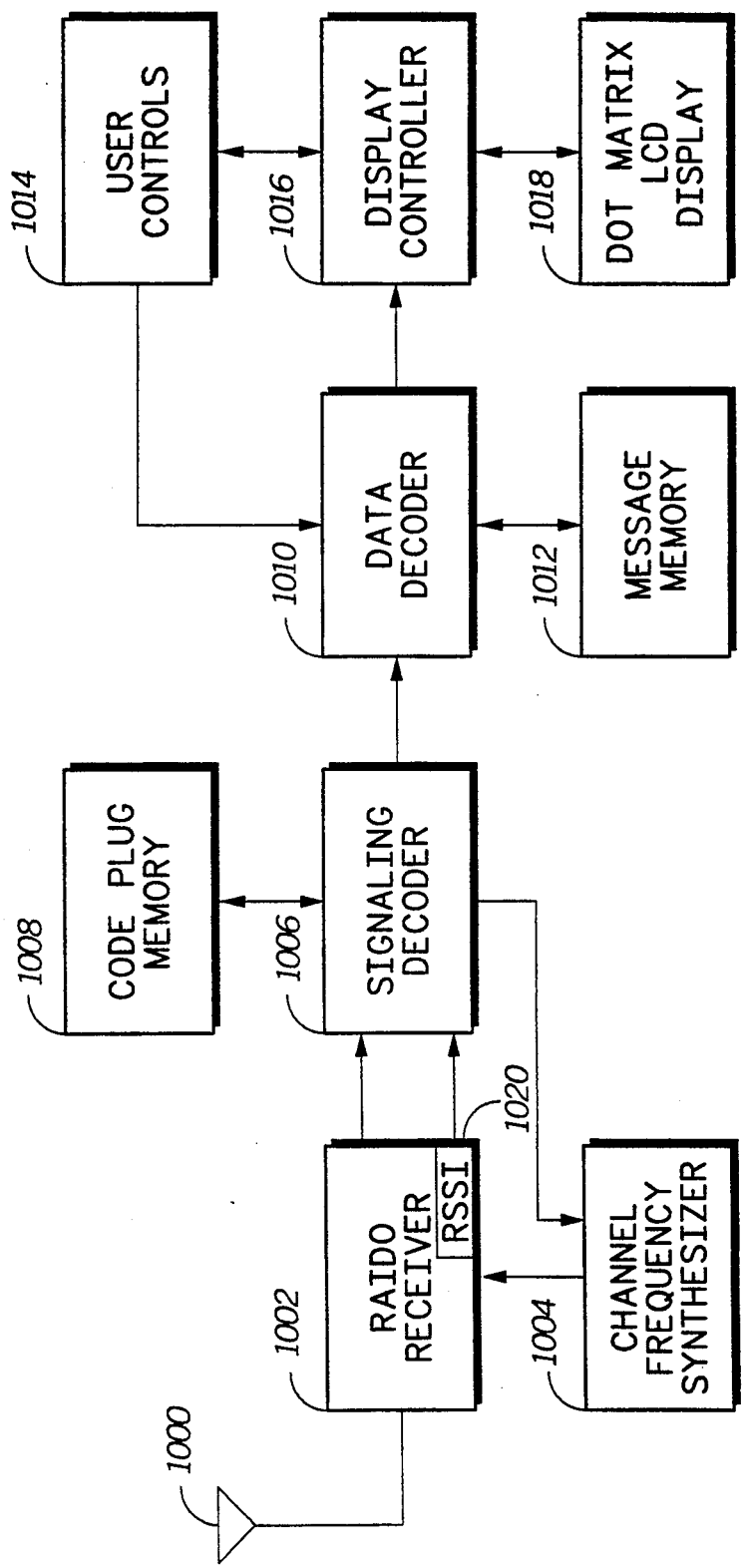
FIG. 10 is an electrical block diagram of a portable communication receiver for use in the satellite based communication system in accordance with the present invention.

FIG. 10 shows an electrical block diagram of a portable communication receiver for use in the satellite based communication system of the present invention. Data packets containing paging addresses and message directed to pagers located in particular geographic areas are beamed down to the pagers in the second predetermined signaling format, corresponding to the signaling format to which the pager decoder is responsive. The data packets are intercepted by the pager antenna 1000 for reception by receiver 1002. Receiver 1002 is a conventional FM receiver operating, preferably in the 900 MHz to 2.0 GHz frequency range. The choice of operating frequency is controlled by the ITU and national regulatory agencies as previously described, and is controlled by channel frequency synthesizer 1004 in a manner well known in the art. The output of receiver 1002 is a stream of binary data corresponding to the received data packet information. The stream of binary data is applied to the input of signaling decoder 1006, where the data is processed in a manner well known in the art. Since the data packets received may be transmitted in any of a plurality of signaling formats, such as the Golay Sequential Code (GSC) or POCSAG signaling formats, data decoder 1010 is adaptive to decode either signaling format. One such adaptive decoder is described in U.S. Pat. No. 4,518,961 to Davis et al., entitled "Universal Paging Device with Power Conservation" which assigned to the assignee of the present invention and which is incorporated by reference herein. The decoder may also adapt to the proper signaling format based on a received codeword from the satellite, such as the country code or location code codewords previously described. When an address is received in the transmitted data packet which corresponds to an address stored in code plug memory 1008, the signaling decoder 1006 generates a control signal enabling the operation of the data decoder 1010. The received message is processed by the data decoder 1010 which converts the message information received in the predetermined signaling format, to BCD or ASCII data which is then stored in the message memory 1012. Upon completion of the processing of the message information, the user is sensibly alerted by an alerting means (not shown) which couples to the signaling decoder 1006, such as by an audible tone, or a tactile vibration to indicate a message has been received. Upon being alerted, the user can read the stored message by means of user controls 1014. The user controls 1014 also provide the user such additional capability as to reset the audible or tactile alert, place the receiver in a deferred page mode, erase the message, and protect the message in a manner well known in the art. The message read from message memory 1012 is supplied to display controller 1016 which provides the necessary conversion from the BCD or ASCII data to that required for display of the message on display 1018. Display 1018 is preferably an LCD display, such as a dot matrix LCD display capable of displaying alphanumeric message information. The recovery of message information from the message memory 1012 and display of the recalled message information is well known in the art.

In normal operation, the receiver is assigned to a home channel for normal operation using a conventional paging system. Or in those instances where no conventional paging system exists, the receiver may be assigned to a home operating frequency for the delivery of messages from the satellite. The choice of the home channel for normal operation is determined by information periodically transmitted on the home channel in a manner well known in the art.

Figure 11:
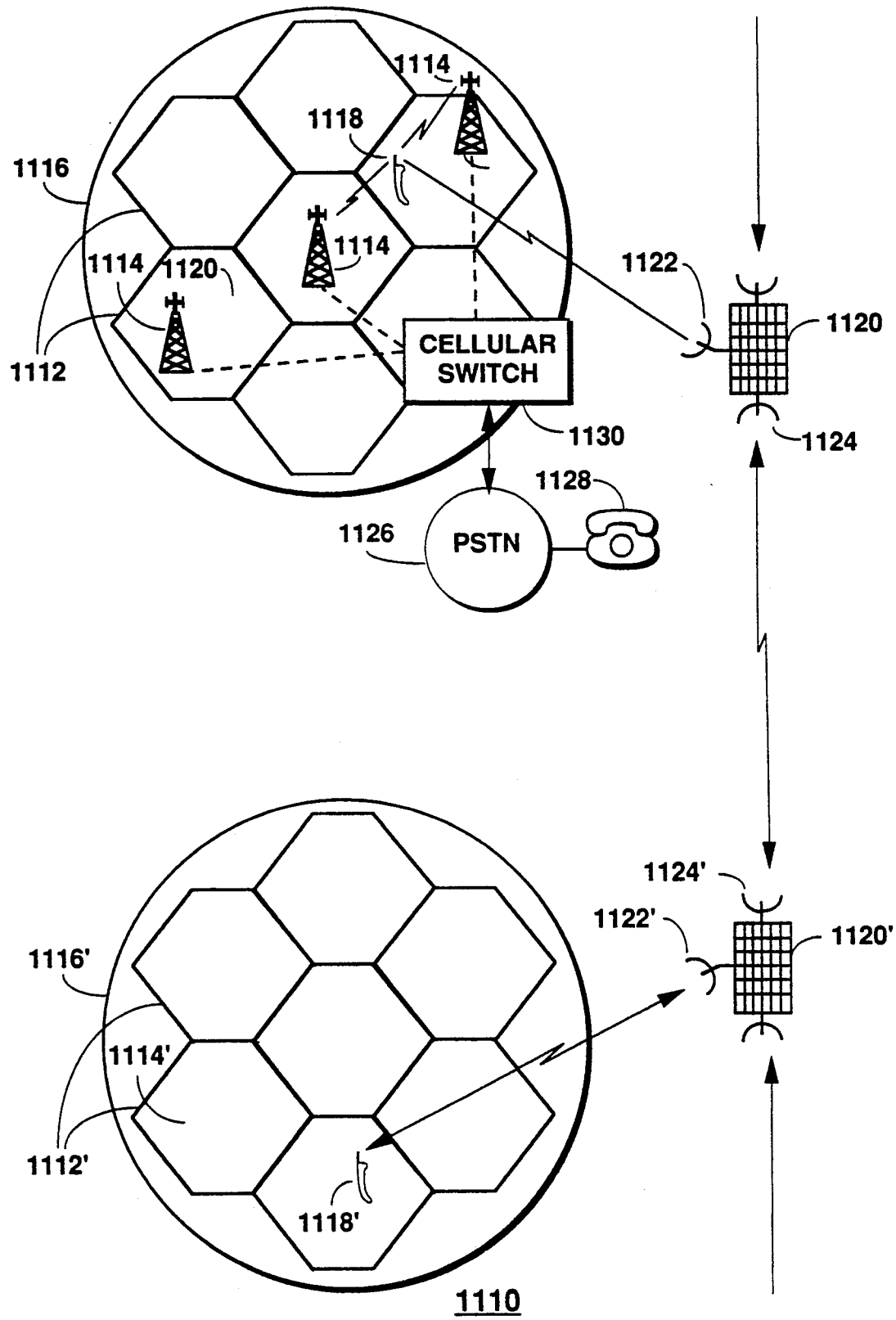
FIG. 11 is a pictoral diagram depicting the operation of two cellular radiotelephone systems interconnected using the satellite based communication system to provide geographic protocol conversion in accordance with the present invention.

FIG. 11 is a pictoral diagram depicting the operation of two cellular radiotelephone systems interconnected using the satellite based communication system to provide geographic protocol conversion in accordance with the present invention. As shown in FIG. 11, a first cellular radiotelephone system operating with a first predetermined message transmission, or communication, protocol is shown providing system coverage within a first geographic area 116. Examples of such message transmission protocols include analog voice communication capability, which is described in U.S. Pat. No. 3,906,166 to Cooper et al., entitled "Radio telephone System", and a second message transmission protocol which provides both voice and data transmission capability and which is described in U.S. Pat. No. 4,654,867 to Labedz et al., entitled "Cellular Voice and Data Radiotelephone System". Both patents are assigned to the assignee of the present invention, and are hereby incorporated by reference herein. The cellular radiotelephone system operating within the first geographic area 1116 is divided into a number of cells 1114 to provide cellular radiotelephone service between mobile or portable cellular radiotelephones 1118 and the conventional telephone service 1126, 1128, in a manner well known in the art. Also as shown in FIG. 11, a second cellular radiotelephone system is shown providing system coverage within a second geographic area 1116', and which utilizes a second message transmission protocol, such as described above, or such as the cellular system proposed for use in Europe. The proposed European cellular radiotelephone system will operate using a digital communication protocol to provide both voice and data transmission capability which is incompatible with the existing analog and digital communication protocols, such as currently in use in the U.S. The cellular radiotelephone system operating within the second geographic area 1116' is also divided into a number of cells 1114' to provide cellular radiotelephone service between mobile or portable cellular radiotelephones 1118' and a conventional telephone service. The second geographic area 1116' can also represent an area in which a conventional cellular communication system is not available, in which case the cells 1114' would correspond to geographic areas covered by the beam of the satellite antenna 1122'.

In addition to providing cellular radiotelephone service between mobile or portable cellular radiotelephones 1118 and conventional telephone services 1126, 1128, the satellite communication system 1110 in accordance with the present invention is capable of providing direct communication between the cellular radio telephones operating in different geographic areas, such as those in geographic areas 1116 and 1116'. When direct communication is provided between the cellular radiotelephones operating in different geographic areas, a first cellular radiotelephone, such as cellular radiotelephone 1118, can directly communicate to a communication satellite 1120 passing overhead. As described above, satellite 1120 is capable of operating on frequencies associated with the particular geographic areas over which the satellite passes, and is further capable of providing communication in the communication protocol in use in the particular geographic area. Thus, cellular readiotelephone 1118 communicates to satellite 1120 using the down-link antenna 1122 which is directed to the first geographic area. As the communication from the cellular radiotelephone 1118 is received at the satellite 1120, the voice and/or data information received in the first communication protocol is converted within the satellite 1120 to an intermediate communication protocol, as will be described below, to enable communication between the orbiting satellites, when required as described above. The voice and/or data information converted to the intermediate communication protocol is transmitted from the first satellite 1120 to a second satellite 1120' using antennas 1124 and 1124' in a manner described above. While FIG. 11 shows a relatively direct communication between satellites 1120 and 1120', it will be appreciated the voice and/or data information may be processed by a number of intermediate satellites (not shown) prior to being received by the second satellite 1120'. Within the second satellite 1120', the voice and/or data information is then converted from the intermediate communication protocol to the final communication protocol in use within the second geographic area 1216' to provide cellular radiotelephone communications. Satellite 1120' then transmits down the voice and/or data information using the down-link antenna 1122' to the second cellular radiotelephone 1118'. Routing of the voice and/or data information is provided in a manner as described above for messages, such as paging messages.

Figure 12:
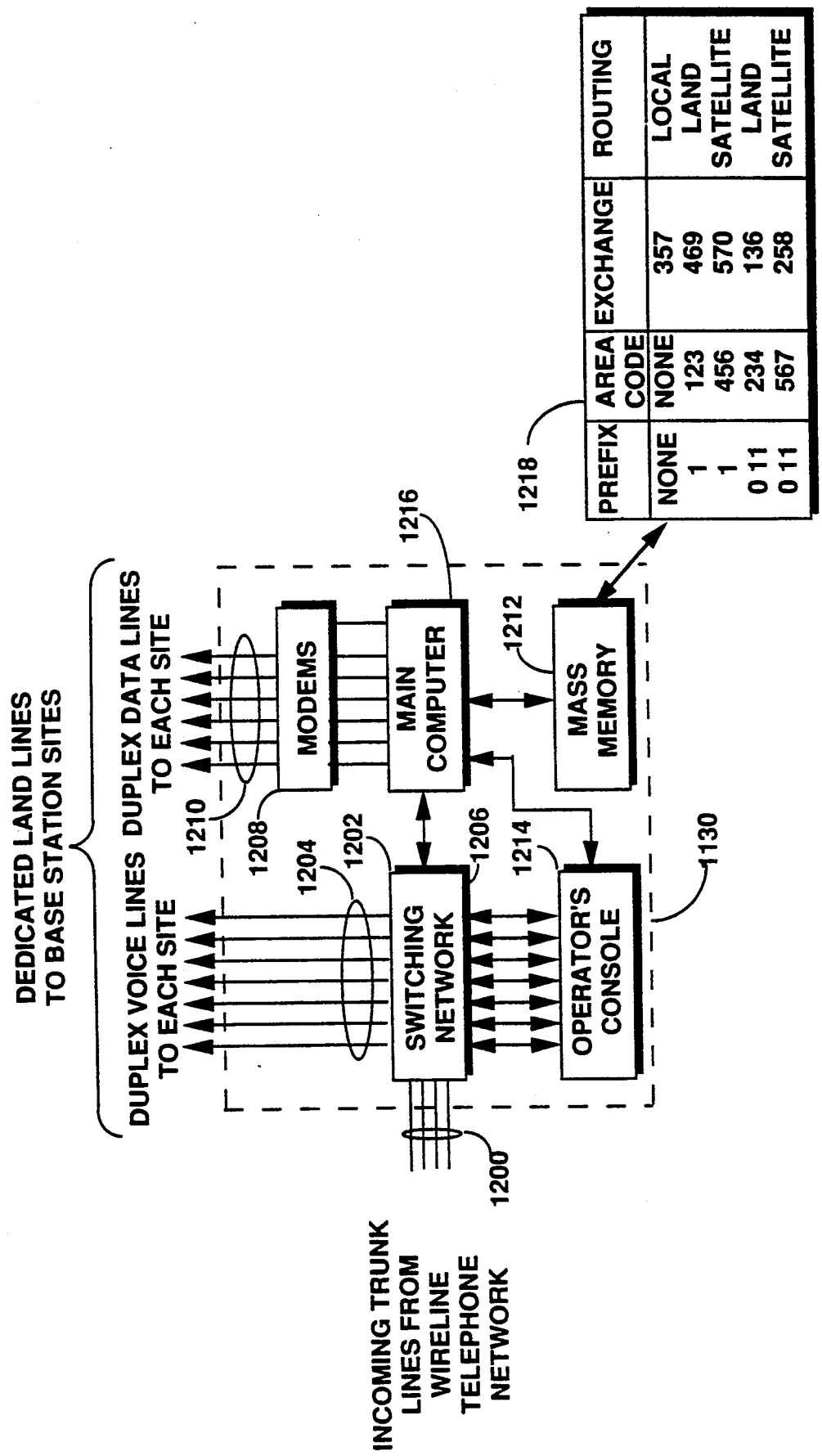
FIG. 12 is an electrical block diagram of the cellular switch utilized with the satellite based communication system in accordance with the present invention.

In the satellite communication system in accordance with the present invention, two embodiments of operation of the cellular radiotelephone are contemplated, one in which the cellular radiotelephone can communicate through a conventional cellular switch to the public switched telephone network or through a satellite as shown in geographic area 1116, and one in which all communication is processed through the satellite. FIG. 12 is an electrical block diagram of the cellular switch 1130 which can be advantageously utilized with the satellite based communication system in accordance with the present invention. In general, the operation of cellular switches is well known in the art, so only a brief description is being provided herein. Calls originated from telephones located throughout the public switched telephone network are coupled through the telephone company central office through phone lines 1200 into the cellular switch switching network 1202. The switching network 1202 selectively couples the calls to the cellular sites in which the cellular radiotelephone is located using duplex voice telephone lines 1204 to each cellular site within the cellular system. The location of each of the cellular radiotelephones within the cellular system is communicated to the cellular switch 1130 via duplex data phone lines 1210 which couple location data modulated as modem tones to modems 1208. The modems 1208 recover the location data which is then coupled to a main computer 1216 which controls the call routing through the switching network 1202. A mass memory 1212 also couples to the main computer 1216 containing such information as cellular radiotelephone identification information, billing information, and other information necessary for the operation of the cellular system. An operator's console 1214 is coupled to the main computer 1216 to enable control of the operation of the cellular system, and to provide access to, and alteration of, information stored in the mass memory 1212. The operator's console 1214 also couples to the switching network 1202 to provide monitoring of the operation of the system.

In the first embodiment of operation of the satellite communication system in accordance with the present invention, when a call is originated from a cellular radiotelephone located within the cellular communication system, the call is initially received at the appropriate cellular base station site and directed via the duplex data lines 1210 to the cellular switch 1130 to establish an initial communication therebetween. A request to interconnect with the cellular switch 1130 is originated by the cellular radiotelephone and is modulated using a modem at the cellular base station for transmission over the duplex data lines 1210 to the cellular switch 1130. The request is demodulated using modems 1208 at the cellular switch 1130 and coupled to the main computer 1216 where the request is processed. Coupled to the main computer 1216 is the mass memory 1212, as described above, which in addition to storing the subscriber information, also stores network routing information, as shown in a table 1218. As shown, table 1218 comprises a list of area codes, and or exchanges, which identify those calls which are handled in a conventional manner. All other calls directed to area codes, and or exchanges not included in table 1218 would be handled by the satellite communication system, as described below. When the request to interconnect is determined to be a call which is directed over the public switched telephone network, the request for interconnect is granted, and cellular communication is completed in a manner well known in the art. When the routing is determined to utilize satellite routing, the cellular switch 1130 directs the cellular radiotelephone to switch to a satellite frequency, in the manner similar to that utilized to assign transmission channels within the system, to establish completion of the call through the satellite communication network. In this manner, the most expedient and cost effective routing of the call is determined by the cellular switch 1130 for the delivery of the call.

Figure 13:
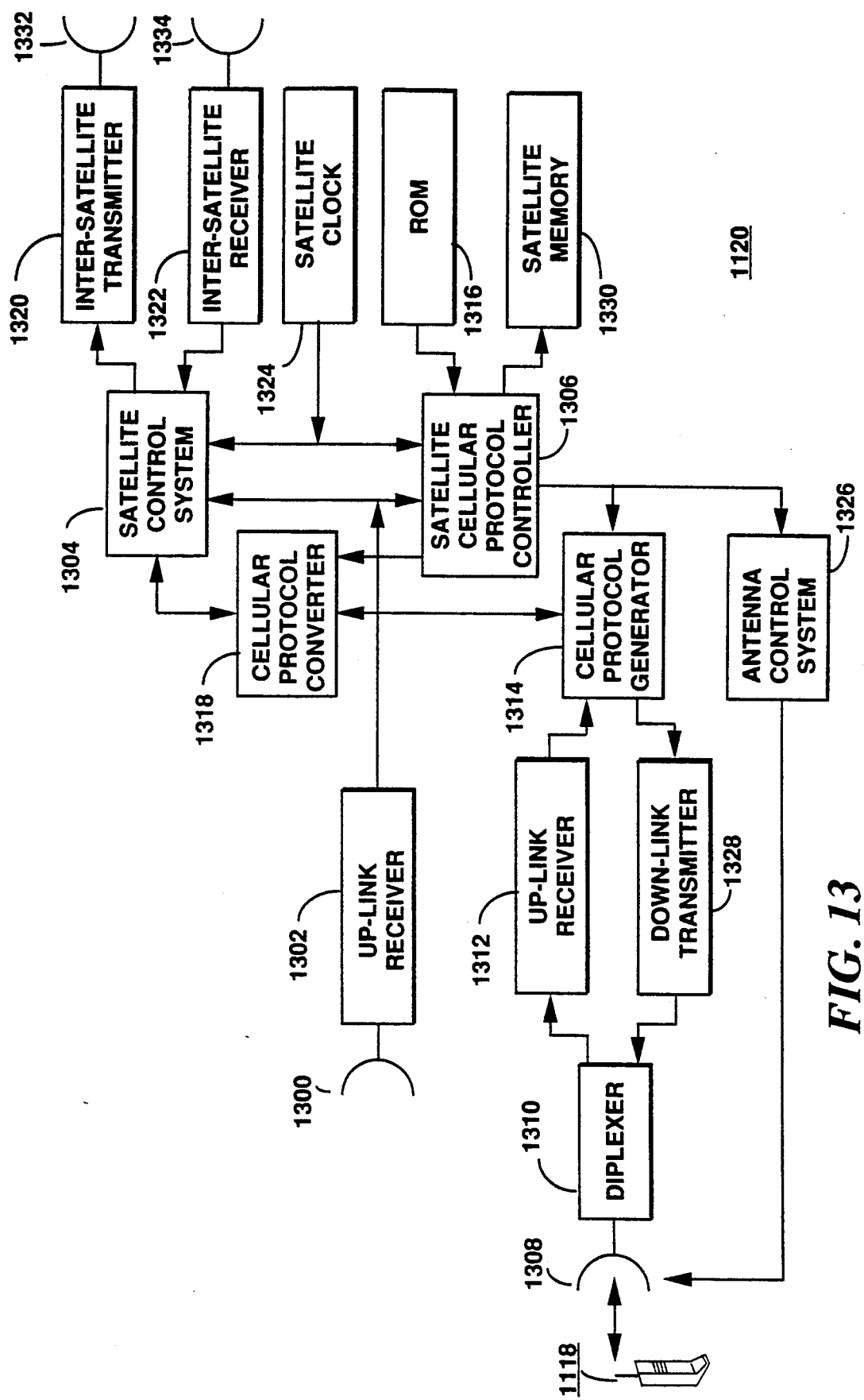
FIG. 13 is an electrical block diagram illustrating the apparatus of the satellites for the satellite based communication system to provide geographic protocol conversion in accordance with the present invention.

FIG. 13 is an electrical block diagram illustrating the apparatus of the satellites for the satellite based communication system to provide geographic protocol conversion in accordance with the present invention. Satellite control information is received by the satellite 1120 by up-link receiver 1302 through antenna 1300. The satellite control information is processed in a manner well known to one skilled in the art by the satellite control system 1304, controlling such satellite parameters as satellite orientation and altitude. The up-link receiver 1302 is also used to receive data which is used to configure the satellite cellular protocol controller 1306, as will be described below. Calls which are originated from a cellular radiotelephone in a first cellular communication protocol are received at the satellite 1120, and are coupled from the antenna 1308 through diplexer 1310 to the up-link receiver 1312. The output of the up-link receiver 1312 is coupled to a cellular protocol generator 1314 which enables communication of the cellular radio telephone 1118 with the satellite 1120 under the control of the satellite cellular protocol controller 1306. When routing information is generated at the cellular switch and is included at the beginning of the call request transmission, the satellite cellular protocol controller 1306 determines which of the nearest satellites will be used in routing the calls to the final destination. When routing information is not generated by the cellular switch 1130, the satellite cellular protocol controller 1306 generates the proper call routing from satellite network information stored in the satellite read only memory (ROM) 1316. When calls are intended for transmission by the other satellites, the output of the satellite protocol generator 1314, which is in the preferred embodiment a recovered analog signal for voice messages, is coupled to a cellular protocol converter 1318, which converts the call received into an intermediate communication protocol which can be transmitted to the appropriate nearest satellite using the intersatellite transmitter 1320 and antenna 1332. The intermediate communication protocol utilizes any of a number of well known digital encoding techniques, such as PCM (pulse code modulation) encoding, to enable a high quality transmission of the voice information from one satellite to another.

When the call is routed to other satellites, the call is received by antenna 1334 which couples to the inter-satellite receiver 1322. The output of the inter-satellite receiver 1322 is coupled through the satellite control system 1304 to the cellular protocol converter 1318 which processes the call transmitted in the intermediate communication protocol into the analog signal suitable for processing by the cellular protocol generator 1314 in the second cellular communication protocol.

When satellites in non-synchronous orbits are utilized, it will be appreciated that any one satellite will remain over a particular geographic area for only a relatively short period of time, as described above. The satellite control system 1304 controls the reception time of calls originated from a cellular radiotelephone in a particular geographic area, as well as the transmission of the calls to the cellular radiotelephone, and controls hand-offs of the calls to other satellites within the orbit, as the satellite moves beyond the coverage area of the particular geographic area. Timing information is generated by the satellite clock 1324 to enable determination of the satellites current position around the world. In this manner, the satellite control system 1304 generates periodic position signals which are coupled to satellite cellular protocol controller 1306, thereby enabling the satellite cellular protocol controller 1306 to determine the cellular communication protocol requirements for each geographical area from protocol information stored in satellite ROM 1316. As the satellite travels over each geographic area during which down-link and up-link communication is made, the satellite cellular protocol controller 1306 controls the down-link antenna 1308 direction via antenna control system 1326. The cellular protocol generator 1314 provides a programmable protocol generating means required for generating the various cellular communication protocols as the satellite sweeps over the surface of the earth. The satellite cellular protocol controller 1306 also controls the transmission frequency of down-link transmitter 1328 and the up-link receiver 1312 thereby allowing calls encoded in the cellular communication protocol for the particular geographic area to be transmitted and received on the correct down-link and up-link frequencies appropriate for the particular geographic area.

In a second embodiment of the cellular protocol conversion process, in those instances where the call is already encoded into a digital format, such as that originating from a digital cellular system, the digitized voice information can be transmitted between satellites without the use of the intermediate communication protocol. In this case, the cellular protocol converter 1318 is used to convert from the first cellular communication protocol to an intermediate communication protocol at the destination satellite, thereby enabling the cellular protocol generator 1314 to generate the second cellular communications protocol for transmission in the second geographic area.

In summary, cellular transmission protocol conversions are required to convert cellular radiotelephone transmissions generated in a first transmission format, such as an analog signaling format, to a second transmission format, such as a digital signaling format. Conversion of analog voice signals into digital signaling formats such as PCM (pulse code modulation) or CVSD (continuously variable slope delta modulation) and back to analog voice signals is well known in the art. Methods to convert different digital signaling formats is also well known in the art.

Figure 14:
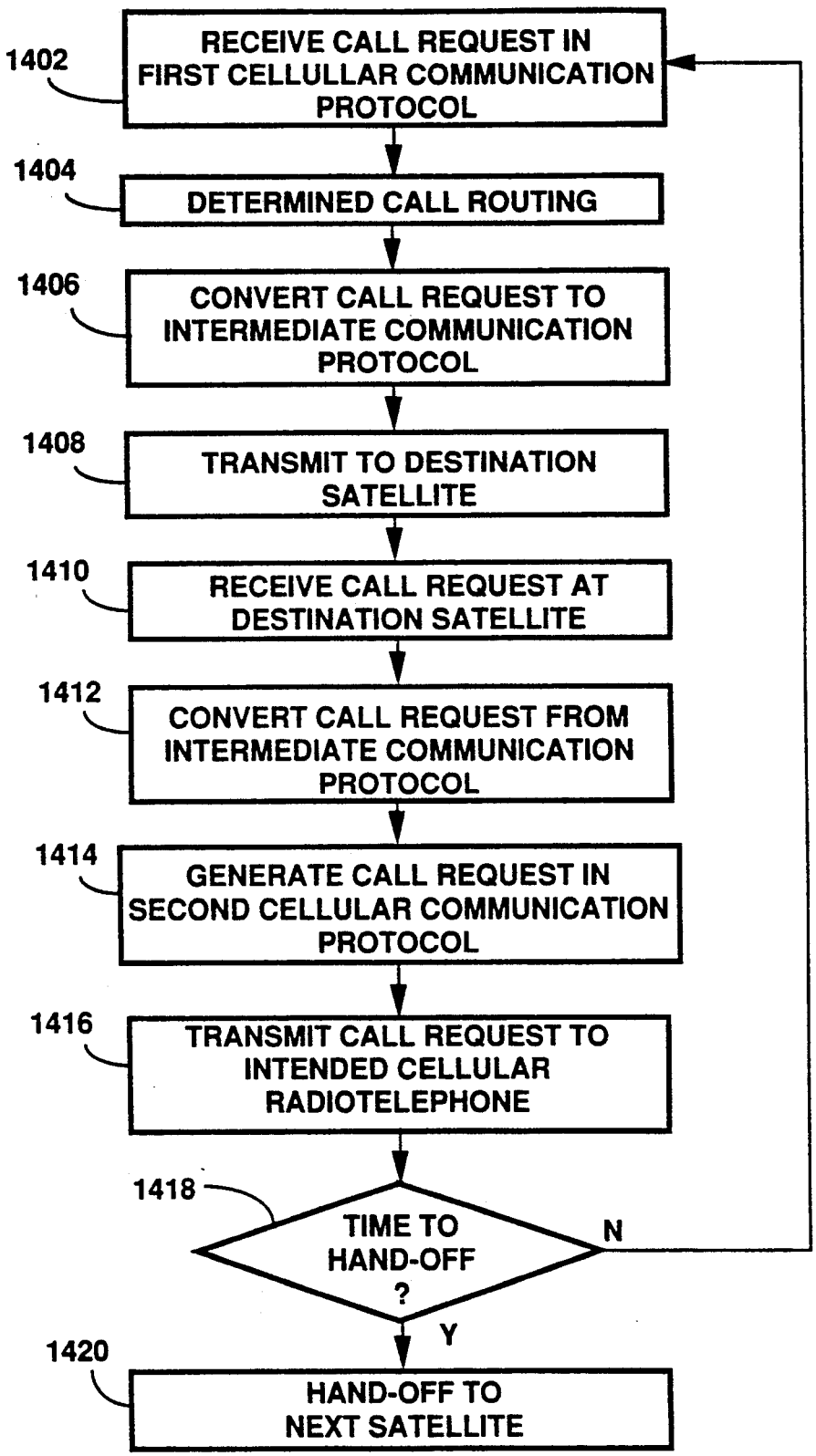
FIG. 14 is a flow chart illustrating the geographic protocol conversion provided between non-compatible cellular communication system using the satellite communication system in accordance with the present invention.

FIG. 14 is a flow chart illustrating the operation of the satellite communication system in accordance with the present invention to provide geographic protocol conversion for cellular radiotelephones operating in two cellular communication systems. A cellular receiver operating in a first geographic area using a first cellular communication protocol transmits a call request which is received by a satellite, at step 1402. From the call request, the routing of the call is determined, at step 1404. The call request is converted to an intermediate communication protocol, at step 1406, for transmission to the destination satellite. The call request encoded in the intermediate communication protocol is transmitted to the destination satellite, at step 1408, either directly, or through a number of intermediate satellites, as described above. The destination satellite receives the call request, at step 1410, and converts the call request encoded in the intermediate communication protocol, at step 1412, to a form suitable for generating a call request in the second cellular communication protocol, at step 1414. The call request in the second cellular communication protocol is transmitted in the destination geographic area to the intended cellular radiotelephone, at step 1416. During the time that the satellite is receiving the call request in the first communication protocol, and during the time the destination satellite is transmitting the call request in the destination geographic area, the satellite positions are monitored with respect to the transmission areas. When either of the satellites is sweeping past the corresponding geographic area, the time to hand-off the communication to another satellite is checked, at block 1418. As long as it is not time to hand-off the call request transmission, the transmissions are handled by the satellites, as described in steps 1402 to 1416. When the time to hand-off the call request transmission is detected, at step 1418, the communication is handed-off to the next satellite in orbit over the corresponding geographic areas. Once the call request has been processed by the cellular radiotelephone in the second geographic area, full voice and/or data message capability is established between the cellular transceivers.

A global satellite based communication system providing geographic protocol conversion has been described. In this system, messages intended for delivery to a pager located anywhere on earth are transmitted to satellites operating in synchronous or non-synchronous orbits in a first signaling format which provides high message throughput. The messages are then transmitted by the satellites using a down-link frequency and conventional signaling protocols to earth based receivers corresponding to each geographical area over which the satellites pass. The global satellite based communication system, in a second embodiment in accordance with the present invention, is capable of delivering calls between cellular radiotelephones operating with different cellular communication protocols in multiple geographic areas. When a call is originated in a first cellular communication protocol, the call is converted either directly to the second cellular communication protocol, or through the use of an intermediate communication protocol, thereby enabling cellular communication with cellular radio telephones operating in conventional cellular transmission systems and with cellular radiotelephones which are operating in geographic areas which are absent of any conventional cellular transmission system. By providing protocol conversion within the satellite, messages may transferred between cellular communication systems offering different cellular transmission protocols. And it will be appreciated, the protocol conversion is transparent with respect to the cellular transceiver operation with respect to establishing a cellular channel, or frequency, or the processing of control information within each of the cellular transmission systems, and the formats employed for the transmission of voice and/or data.

We claim:

1. A satellite communication system providing geographic protocol conversion for message delivery between communication transceivers operating within at least two geographic areas, said satellite based communication system comprising:
 a first communication transceiver, providing two-way message delivery within a first radiotelephone network located within at least a first geographic area, the two-way message being encoded in a first predetermined message transmission protocol, said first communication transceiver further enabling two-way message delivery with a communication satellite, the message also being encoded in the first predetermined message transmission protocol;
 said communication satellite, comprising
  a satellite transceiver, for enabling the two-way delivery of the message encoded in the first predetermined message transmission protocol with said first communication transceiver,
  protocol converting means, for converting the message encoded in the first predetermined message transmission protocol into a message encoded in a second predetermined message transmission protocol, and
  said satellite transceiver further for enabling two-way delivery of the message encoded in the second predetermined message transmission protocol with at least a second communication transceiver operating within a second geographic area.

2. The satellite communication system according to claim 1, wherein said communication satellite further comprises:
 memory means, for storing a table correlating the predetermined message transmission protocol requirements for each geographical delivery area; and
 controller means, coupled to said protocol converting means and to said memory means, for controlling the conversion of the message received in the first predetermined message transmission protocol into the message deliverable in the second predetermined message transmission protocol based on the current geographical delivery area.

3. The satellite communication system according to claim 2, wherein said satellite transmitter means is capable of transmitting on a plurality of frequencies and said satellite receiving means is further capable of receiving on a plurality of frequencies, said memory means further storing a table correlating transmitter and receiver frequencies to the geographic delivery areas, and wherein said controller means is further responsive to the geographic delivery areas, for controlling the message delivery on one or more of the plurality of transmitter and receiver frequencies for each of the plurality of geographic delivery areas.

4. The satellite communication system according to claim 1, wherein said first and second communication transceivers are cellular radiotelephone transceivers.

5. The satellite communication system according to claim 4 wherein the message transmitted in the first predetermined message transmission protocol is transmitted utilizing an analog cellular communication protocol.

6. The satellite communication system according to claim 4 wherein the message transmitted in the second predetermined message transmission protocol is transmitted utilizing a digital cellular communication protocol.

7. The satellite communication system according to claim 6, wherein the digital cellular communication protocol provides both voice and data transmission capability.

8. The satellite communication system according to claim 1, wherein said satellite communication system includes a plurality of satellites orbiting in synchronous orbits within a plurality of orbiting planes.

9. The satellite communication system according to claim 8, wherein each of said satellites further comprising inter-satellite communication means for forwarding the message received in the first predetermined message transmission protocol to an adjacent satellite in the first predetermined message transmission protocol.

10. The satellite communication system according to claim 8, wherein each of said satellites further comprising inter-satellite communication means for forwarding the message received in first predetermined message transmission protocol to an adjacent satellite in the an intermediate message transmission protocol.

11. The satellite communication system according to claim 10, wherein said satellite base communication system comprises cellular switching means for providing cellular communications between said first communication transceiver and a public switched telephone network within at least said first geographic area.

12. The satellite communication system according to claim 11, wherein said cellular switching means further comprises memory means for storing message routing information, and said cellular switching means is responsive to the message routing information for routing the message received from the first communication transceiver to the public switched telephone network.

13. The satellite communication system according to claim 11, wherein said cellular switching means further comprises memory means for storing message routing information, and said cellular switching means is responsive to the message routing information for routing the message received from the first communication transceiver to the communication satellite.

14. The satellite communication system according to claim 8, wherein said communication satellite further comprises:
   timing means, for generating timing information; and
   controller means, responsive to the timing signals, for controlling the message delivery between said communication satellite and said communication transceiver operating in a particular geographic area.

15. The satellite communication system according to claim 14, wherein each of said satellites further comprising inter-satellite communication means for communicating with adjacent satellites within a given orbiting plane, and said controller means is further responsive to said timing means for transferring the message between said communication satellite and said communication transceiver to an adjacent satellite in the given orbiting plane.

16. The satellite communication system according to claim 1, wherein said second communication transceiver further provides two-way message delivery within a second radiotelephone network located within the second geographic area, the two-way message also being encoded in the second predetermined message transmission protocol.

* * * * *